(12) United States Patent
Hayashida et al.

(10) Patent No.: US 6,248,475 B1
(45) Date of Patent: Jun. 19, 2001

(54) NICKEL-HYDROGEN SECONDARY BATTERY

(75) Inventors: Hirotaka Hayashida, Fujisawa; Masaaki Yamamoto, Chiba-ken; Hiroshi Kitayama, Fujisawa; Shusuke Inada; Isao Sakai, both of Yokohama; Tatsuoki Kono, Kawasaki; Hideki Yoshida, Yokohama; Takamichi Inaba, Yokohama; Motoya Kanda, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/200,464

(22) Filed: Nov. 27, 1998

(30) Foreign Application Priority Data

Nov. 28, 1997 (JP) .................................................. 9-329213
Nov. 28, 1997 (JP) .................................................. 9-329214
Nov. 28, 1997 (JP) .................................................. 9-329216

(51) Int. Cl.$^7$ ..................................................... H01M 4/58
(52) U.S. Cl. ....................................... 429/218.2; 420/900
(58) Field of Search .......................... 429/218.2; 420/900

(56) References Cited

U.S. PATENT DOCUMENTS 5,840,166 * 11/1998 Kaneko .................................. 429/29
5,964,968 * 10/1999 Kaneko ............................ 429/218.2

FOREIGN PATENT DOCUMENTS 60-180058   9/1985   (JP) .
5-343060    12/1993  (JP) .
6-223868    8/1994   (JP) .
7-099686    10/1995  (JP) .
9-25529   * 1/1997   (JP) .
10-251782 * 9/1998   (JP) .
10-259436 * 9/1998   (JP) .
WO 97/03213 1/1997   (WO) .

* cited by examiner

*Primary Examiner*—Laura Weiner
(74) *Attorney, Agent, or Firm*—Oblon, Spivak, McClelland, Maier & Neustadt, P.C.

(57) ABSTRACT

There is provided a nickel-hydrogen secondary battery which comprises a negative electrode comprising a hydrogen-absorbing alloy represented by the following general formula (A), a positive electrode, and an alkaline electrolyte, and which meets the conditions represented by the formulas (1) and (2), $$(R_{1-x}Mg_x)Ni_yA_z \quad (A)$$

wherein R is at least one element selected from rare earth elements (including yttrium), Ca, Zr and Ti, A is at least one element selected from Co, Mn, Fe, V, Cr, Nb, Al, Ga, Zn, Sn, Cu, Si, P and B, and x, y and z are atomic ratio individually defined as $0<x<1$, $0 \leq z \leq 1.5$, $2.5 \leq y+z<4.5$, $$3.2 \leq P \leq 5.0 \quad (1)$$

$$0.9 \leq Q \leq 0.2P+0.7 \quad (2)$$

wherein P is a quantity (g) of the hydrogen-absorbing alloy per theoretical capacity 1 Ah of the positive electrode, and Q is a quantity (mL) of the alkaline electrolyte per theoretical capacity 1 Ah of the positive electrode.

10 Claims, 4 Drawing Sheets

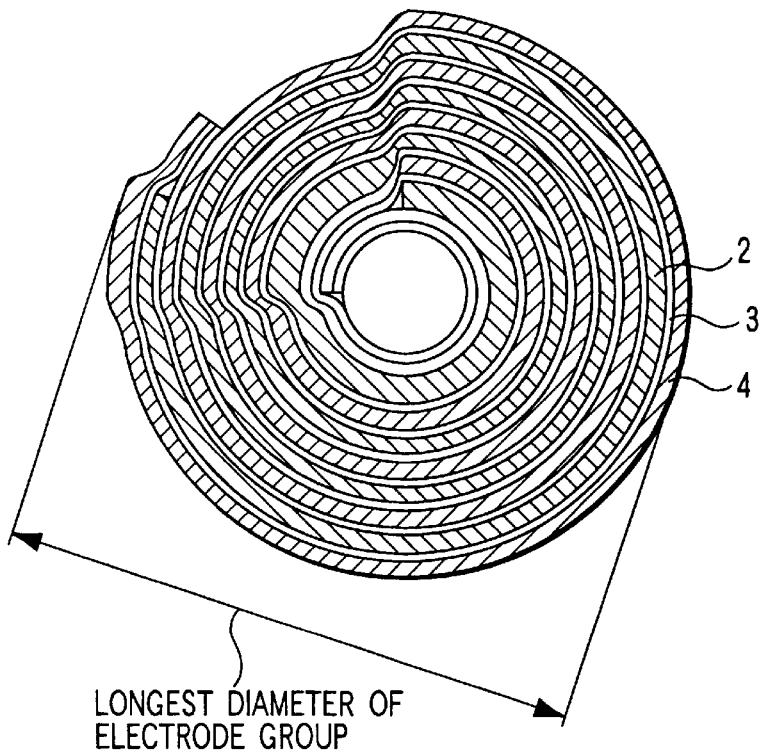
FIG. 2 LONGEST DIAMETER OF ELECTRODE GROUP
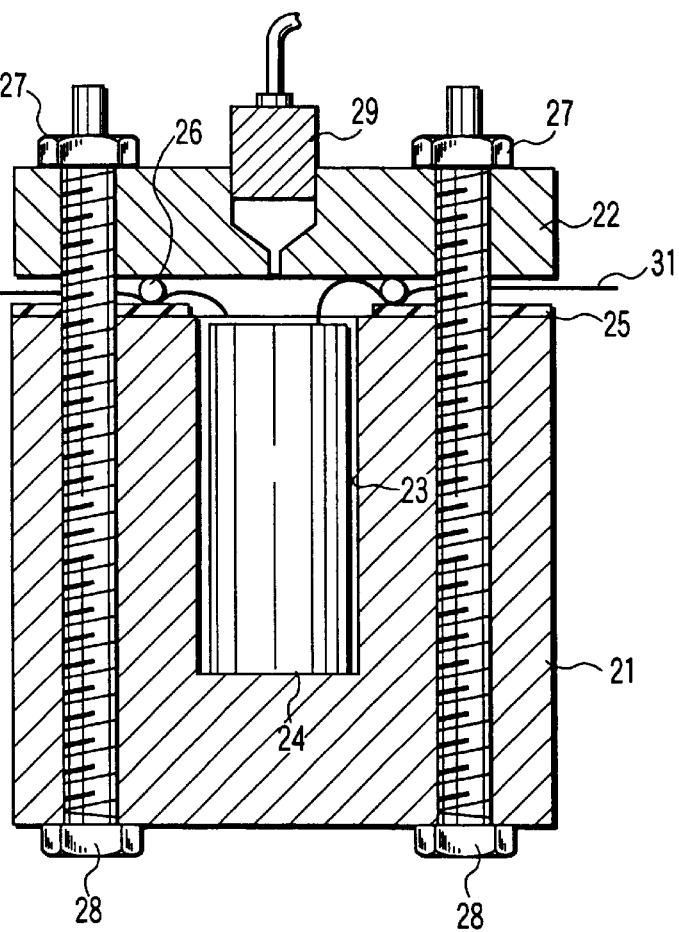
FIG. 4

NICKEL-HYDROGEN SECONDARY BATTERY

BACKGROUND OF THE INVENTION

This invention relates to a nickel-hydrogen secondary battery.

As a nickel-hydrogen secondary battery where a hydrogen-absorbing alloy is employed as a negative electrode, those provided with a negative electrode comprising an $LaNi_5$-based alloy containing $CaCu_5$ type structure phase as a main phase, or an alloy having a Laves type structure and containing constituent elements such as Ti, Zr, V and Ni have been conventionally put into practical use. In particular, most of secondary batteries produced at present is occupied by a nickel-hydrogen secondary battery employing an $LaNi_5$-based alloy, and this nickel-hydrogen secondary battery has been extensively employed. However, since the hydrogen absorption capacity of the $LaNi_5$-based alloy is basically in the ratio of 1:1 (hydrogen atom:metal element), it is very difficult with this $LaNi_5$-based alloy to enhance the hydrogen absorption over the aforementioned ratio. When this hydrogen absorption capacity of the $LaNi_5$-based alloy is converted into an electrochemical capacity, it corresponds to about 370 mAh/g. However, since the $LaNi_5$-based alloy which is currently employed in the nickel-hydrogen secondary battery already indicates a hydrogen absorption capacity of as high as about 330 mAh/g, a more prominent increase in capacity density can be hardly expected as far as this $LaNi_5$-based alloy is concerned.

On the other hand, the Laves type alloy is known as being capable of absorbing hydrogen in the ratio of 1:1 or more (hydrogen atom:metal element). Therefore, it is theoretically possible with this Laves type alloy to enhance the capacity density of hydrogen absorption. However, this Laves type alloy is accompanied with problems that a stable oxide film tends to be formed on the surface of the alloy thereby making it impossible to sufficiently utilize the alloy, that it takes a relatively long time for initially activating the alloy, that it is difficult to obtain a sufficient charge/discharge efficiency, and that it is difficult to achieve a high capacity density in concurrent with other desired battery properties, thus making it difficult to extensibly utilize the Laves type alloy.

Meanwhile, a newly developed hydrogen-absorbing alloy comprising magnesium, nickel and a rare earth element is advantageous over the $LaNi_5$-based alloy and Laves type alloy in that the absorption capacity density thereof both per volume and per weight is higher than that of the $LaNi_5$-based alloy, that the activation velocity thereof is higher than that of the Laves type alloy, and that it is possible to obtain an excellent charge/discharge efficiency as compared with the Laves type alloy. Therefore, it is possible with this hydrogen-absorbing alloy to realize a secondary battery exhibiting a higher capacity as compared with a secondary battery employing the $LaNi_5$-based alloy and also exhibiting a more excellent charge/discharge efficiency as compared with a secondary battery employing the Laves type alloy.

However, a nickel-hydrogen secondary battery provided with a negative electrode comprising a hydrogen-absorbing alloy containing magnesium, nickel and a rare earth element is also accompanied with the problems that, if the quantity of electrolyte per capacity of battery and the quantity of hydrogen-absorbing alloy of the negative electrode are made identical with those of the battery employing the $LaNi_5$-based alloy, it would result not only in a failure to achieve an enhancement in capacity of the battery, but also in an increase in inner pressure due to an insufficient gas recombination reaction at the occasion of overcharging at the negative electrode or in a decrease in discharge capacity at low temperatures.

Meantime, Japanese Patent Unexamined Publication No. H/5-343060 discloses a battery provided with a negative electrode containing a hydrogen-absorbing alloy at packing density of 5.2 to 5.7 g/cm³. This publication recommends the employment of a Ti—Ni type hydrogen-absorbing alloy as the hydrogen-absorbing alloy.

Further, Japanese Patent Unexamined Publication H/6-223868 discloses an alkaline secondary battery provided with a case housing therein an electrode group consisting of a positive electrode, a negative electrode and a separator interposed between the positive electrode and the negative electrode, wherein the electrode group is constructed such that the dimensional relationship between the total thickness B of the layers constituting the electrode group and the width A of the inner dimension of the case as taken along the thickness-wise direction of the electrode group becomes 1 to less than 1.

Furthermore, International Re-publication No. WO97/03213 discloses a electrode comprising a hydrogen-absorbing alloy having a specific antiphase boundary and a composition represented by the following general formula (1). This hydrogen-absorbing alloy is mentioned therein as having a $LaNi_5$ crystal structure.

$$(R_{1-x}L_x)(Ni_{1-y}M_y)_z \tag{1}$$

wherein R is La, Ce, Pr, Nd or mixture elements thereof; L is Gd, Tb, Dy, Ho, Er, Tm, Yb, Lu, Y, Sc, Mg, Ca or mixture elements thereof; M is Co, Al, Mn, Fe, Cu, Zr, Ti, Mo, Si, V, Cr, Nb, Hf, Ta, W, B, C or mixture elements thereof; and x, y and z are atomic ratio individually defined as $0.05 \leq x \leq 0.4$, $0 \leq y \leq 0.5$, and $3.0 \leq z < 4.5$.

BRIEF SUMMARY OF THE INVENTION

Accordingly, an object of the present invention is to provide a nickel-hydrogen secondary battery which comprises a negative electrode comprising a hydrogen-absorbing alloy containing magnesium as a constituent element, and is capable of having a large capacity and retaining a practical gas recombination property and a practical low temperature discharge property.

A further object of this invention is to provide a nickel-hydrogen secondary battery which comprises a negative electrode comprising a hydrogen-absorbing alloy containing magnesium as a constituent element, and a case housing the negative electrode, wherein the mechanical property of the case is controlled such that any volume change due to an expansion and shrinkage of the negative electrode can be absorbed by an elastic deformable region of the case, thus making it possible to maintain the balance of an electrode group housed in the battery and to overcome the problems such as internal short-circuit, internal pressure increase and swelling which, otherwise, might be caused starting from a relatively early stage of the charge/discharge cycles.

A still further object of this invention is to provide a nickel-hydrogen secondary battery which comprises a negative electrode comprising a hydrogen-absorbing alloy containing magnesium as a constituent element, wherein the negative electrode is improved so as to realize a high capacity per volume and to inhibit the self discharge at the initial stage of the charge/discharge cycles.

Namely, according to the present invention, there is provided a nickel-hydrogen secondary battery which comprises a negative electrode comprising a hydrogen-absorbing alloy represented by the following general formula (A), a positive electrode, and an alkaline electrolyte, and which meets the following conditions represented by the following formulas (1) and (2);

$$(R_{1-x}Mg_x)Ni_yA_z \quad (A)$$

wherein R is at least one element selected from rare earth elements (including yttrium), Ca, Zr and Ti; A is at least one element selected from Co, Mn, Fe, V, Cr, Nb, Al, Ga, Zn, Sn, Cu, Si, P and B; and x, y and z are atomic ratio individually defined as $0<x<1$, $0\leq z\leq 1.5$, $2.5\leq y+z<4.5$;

$$3.2\leq P\leq 5.0 \quad (1)$$

$$0.9\leq Q\leq 0.2P+0.7 \quad (2)$$

wherein P is a quantity (g) of the hydrogen-absorbing alloy per theoretical capacity 1 Ah of the positive electrode; and Q is a quantity (mL) of the alkaline electrolyte per theoretical capacity 1 Ah of the positive electrode.

According to the present invention, there is further provided a nickel-hydrogen secondary battery which comprises a case having a tensile strength of 65 to 80 kgf/mm², a yield point of 30 to 55 kgf/mm² and an elastic modulus of 20,000 to 30,000 kgf/mm², and a negative electrode housed in the case and the negative electrode comprising a hydrogen-absorbing alloy represented by the following general formula (A);

$$(R_{1-x}Mg_x)Ni_yA_z \quad (A)$$

wherein R is at least one element selected from rare earth elements (including yttrium), Ca, Zr and Ti; A is at least one element selected from Co, Mn, Fe, V, Cr, Nb, Al, Ga, Zn, Sn, Cu, Si, P and B; and x, y and z are atomic ratio individually defined as $0<x<1$, $0\leq z\leq 1.5$, $2.5\leq y+z<4.5$.

According to the present invention, there is further provided a nickel-hydrogen secondary battery which comprises an electrode group constituted by a negative electrode comprising a mixture containing a hydrogen-absorbing alloy represented by the following general formula (A) and a conductive substrate carrying the mixture, a positive electrode, and a separator interposed between the negative electrode and the positive electrode, and a case housing the electrode group, the electrode group being 98 to 110% in tightness, and the mixture in the negative electrode being 5.1 to 5.8 g/cc in density;

$$(R_{1-x}Mg_x)Ni_yA_z \quad (A)$$

wherein R is at least one element selected from rare earth elements (including yttrium), Ca, Zr and Ti; A is at least one element selected from Co, Mn, Fe, V, Cr, Nb, Al, Ga, Zn, Sn, Cu, Si, P and B; and x, y and z are atomic ratio individually defined as $0<x<1$, $0\leq z\leq 1.5$, $2.5\leq y+z<4.5$.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a cross-sectional view showing a spiral type electrode group;

FIG. 4 is a cross-sectional view of a battery internal pressure-measuring apparatus employed in Examples of this invention.

Figure 1:
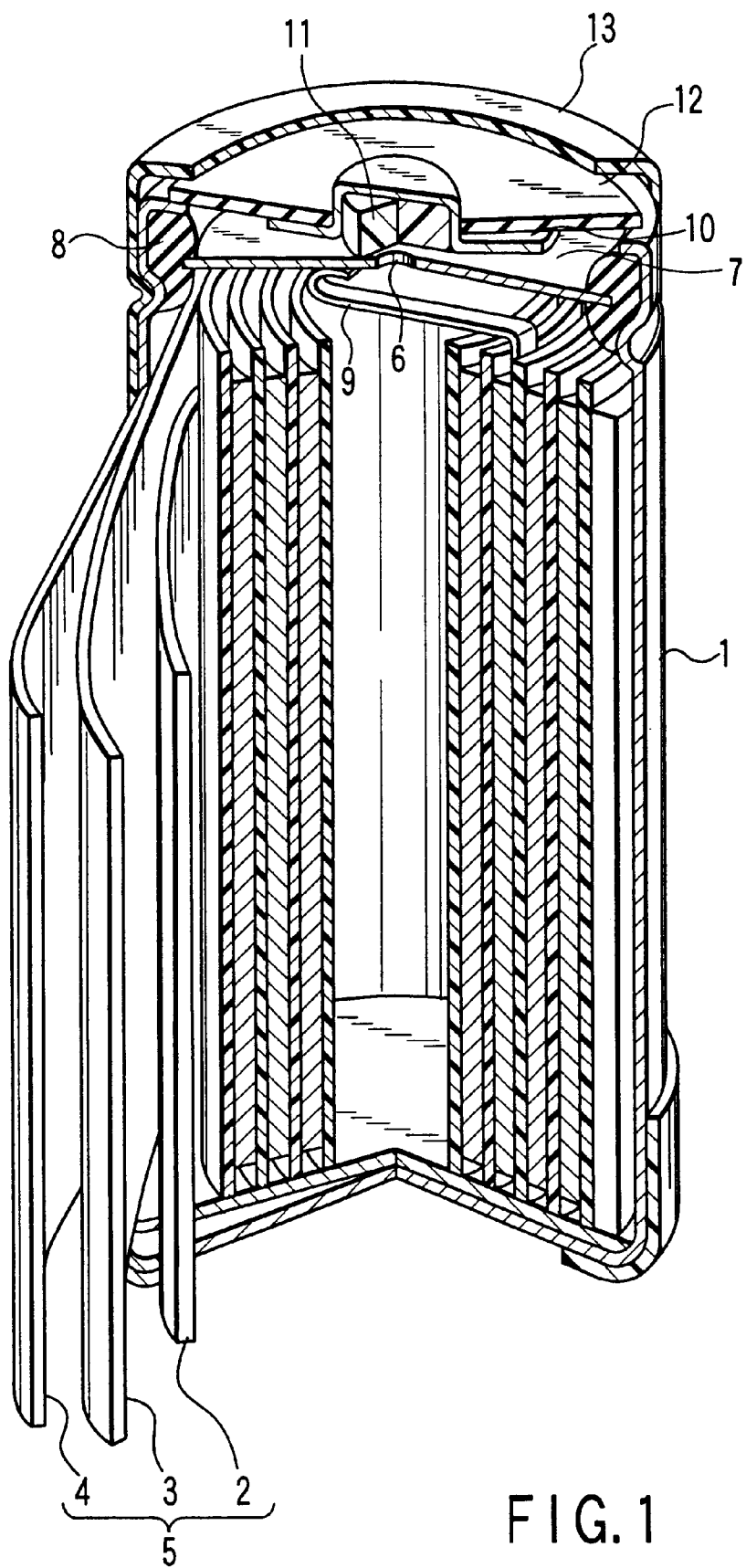
FIG. 1 is a partially sectioned perspective view showing a cylindrical nickel-hydrogen secondary battery representing one embodiment of an alkaline secondary battery of this invention.

DETAILED DESCRIPTION OF THE INVENTION (1) A first nickel-hydrogen secondary battery This invention will be explained further with reference to FIG. 1 showing a cylindrical nickel-hydrogen secondary battery representing one embodiment of the nickel-hydrogen secondary battery of this invention.

Referring to FIG. 1, a bottomed cylindrical case 1 is accommodated therein with an electrode group 5 which has been manufactured by stacking a positive electrode 2, a separator 3 and a negative electrode 4, and then by spirally winding the stacked body. The negative electrode 4 is disposed at the outermost periphery of the electrode group 5 so as to electrically contact with the cylindrical case 1. The cylindrical case 1 contains an alkaline electrolyte. A sealing plate 7 formed of a disk having an opening 6 at the center is disposed on the upper opening of the cylindrical case 1. An insulating gasket 8 having a ring-like shape is interposed between the periphery of the first sealing plate 7 and the upper inner wall surface of the opening of the cylindrical case 1. The peripheral fringe portion of the opening of the cylindrical case 1 is caulked inward so that the first sealing plate 7 is hermetically fixed via the gasket 8 to cylindrical case 1. The positive electrode lead 9 is connected through its one end to the positive electrode 2 and through its other end to the lower surface of the first sealing plate 7. A positive electrode terminal 10 having a hat-like shape is mounted over the first sealing plate 7 in such a manner as to cover the opening 6. A rubber safety valve 11 is disposed in a space surrounded by the first sealing plate 7 and the positive electrode terminal 10 in such a manner as to seal the opening 6. A holding plate 12 formed of an insulating disk having an opening at the center is disposed over the positive electrode terminal 10 in such a manner that the projected portion of the positive electrode terminal 10 is protruded out through the opening of the holding plate 12. An envelope tube 13 is disposed to cover all of the periphery of the holding plate 12, the side wall of the cylindrical case 1 and the periphery of the bottom of the cylindrical case 1.

Next, the details of the positive electrode 2, the negative electrode 4, the separator 3 and the electrolyte will be explained.

(1) The positive electrode 2

This positive electrode 2 contains nickel hydroxide, and can be manufactured by a process wherein a conductive material is added at first to an active material, i.e. nickel hydroxide powder to obtain a mixture, which is then kneaded together with a binder and water to prepare a paste, which is then stuffed into a conductive substrate and, after being dried, molded into a predetermined shape.

Although there is not any particular limitation regarding the nickel hydroxide powder to be employed in this invention as far as the nickel hydroxide is capable of normally charging and discharging, it is preferable in view of obtaining desired properties as a battery to contain a transition metal such as zinc and cobalt.

As for the conductive material, cobalt oxide, cobalt hydroxide can be used.

Examples of the binder are carboxymethyl cellulose, methyl cellulose, sodium polyacrylate, polytetrafluoroethylene and polyvinyl alcohol (PVA).

The conductive substrate may be formed of a mesh-like, sponge-like, fibrous or metallic porous body which is made of a metal such as nickel, stainless steel or a nickel-plated metal.

(2) The negative electrode 4

This negative electrode comprises a hydrogen-absorbing alloy represented by the following general formula (A);

$$(R_{1-x}Mg_x)Ni_yA_z \quad (A)$$

wherein R is at least one element selected from rare earth elements (including yttrium), Ca, Zr and Ti; A is at least one element selected from Co, Mn, Fe, V, Cr, Nb, Al, Ga, Zn, Sn, Cu, Si, P and B; and x, y and z are atomic ratio individually defined as $0<x<1$, $0\leq z\leq 1.5$, $2.5\leq y+z<4.5$;

This negative electrode 4 can be manufactured for example by a method wherein a conductive material is added at first to a hydrogen-absorbing alloy powder and then kneaded together with a binder and water to prepare a paste, which is then stuffed into a conductive substrate and, after being dried, press-molded into a predetermined shape, thereby forming the negative electrode.

As for the R to be incorporated into the hydrogen-absorbing alloy, it is preferable to employ a rare earth element (including yttrium). Further, if a rare earth element is to be employed as the R, it is more preferable in view of saving the manufacturing cost of a hydrogen-absorbing electrode to employ at least one kind of rare earth elements selected from the group consisting of La, Ce, Pr, Nd and Y. One example of such a preferable example of the R is a misch-metal (Mm) which is a mixture of rare earth elements such as Ce-rich Mm and La-rich Lm.

It is also possible to employ, as the R, a mixture containing at least one element selected from Ca, Zr and Ti, in addition to the aforementioned rare earth elements. In this case, the former elements may be incorporated therein substituting for 30 atom. % or less of the rare earth elements.

When the range of the x in the general formula (A) is confined to the aforementioned limitation, it is possible to overcome the problem of difficulty in releasing hydrogen and hence to realize a large discharge capacity. In particular, the range of the x should more preferably be confined to the range of $0.1\leq x\leq 0.6$. Because if the x is less than 0.1, the problem of difficulty in releasing hydrogen from the hydrogen-absorbing alloy may not be sufficiently overcome, thus making it difficult to obtain a secondary battery of large discharge capacity. On the other hand, if the x exceeds over 0.6, the reversible absorption/desorption quantity of the alloy would be deteriorated, thus making it difficult to obtain a secondary battery of large discharge capacity. A most preferable range of the x is $0.15\leq x\leq 0.45$.

When the range of the z in the general formula (A) absorbing alloy is confined to the aforementioned limitation, it is possible not only to enhance the hydrogen absorption/desorption property such as the hydrogen absorption/desorption rate of the alloy, but also to prominently improve the charge/discharge cycle property of the nickel-hydrogen secondary battery. However, if the z exceeds over 1.5, the discharge capacity of the secondary battery would be deteriorated. Therefore, a most preferable range of the z is $0.1\leq z\leq 1.0$.

The A in the general formula (A) should preferably be at least one element selected from Co and Mn. Namely, the inclusion of these elements as A for a hydrogen-absorbing alloy to be incorporated in a negative electrode of secondary battery would lead to an improvement of the charge/discharge cycle property of the battery. In particular, when Co is included as A, the discharge capacity of the battery can be also enhanced.

When the value of the y+z in the general formula (A) is confined to 2.5 or more, it is possible to prominently improve the hydrogen absorption/desorption property such as the hydrogen absorption/desorption rate of the alloy, and hence to enhance the discharge capacity and charge/discharge cycle property of the nickel-hydrogen secondary battery. However, if the y+z exceeds over 4.5, the hydrogen site of the alloy would be decreased, thus reducing the hydrogen absorption capacity of the alloy and hence deteriorating the discharge capacity of the secondary battery. Therefore, a more preferable range of the y+z is $3.0\leq y+z\leq 3.8$.

The hydrogen-absorbing alloy should preferably be such that, when the alloy is analyzed by an X-ray diffraction method using CuK α-ray, the alloy exhibits a highest peak in the range of $42.1°\pm 1°$ and does not exhibit a peak having an intensity of more than 15% of the aforementioned highest peak in the range of $30.2°\pm 1°$. In other words, the hydrogen-absorbing alloy is analyzed by an X-ray diffraction method using CuK α-ray, a highest peak appears in the range of $42.1°\pm 1°$, and a peak does not appear in the range of $30.2°\pm 1°$, or even if a peak appears in the range of $30.2°\pm 1°$, the peak should be of not more than 15% in intensity of the aforementioned highest peak. It should be noted that the intensity of each peak is one obtained by subtracting the intensity of the background from the intensity of the peak actually measured.

If the hydrogen-absorbing alloy is constructed as mentioned above, the alloy contains as a principal phase a phase having an $AB_3$ type crystal structure such as $CeNi_3$ type crystal structure and $PuNi_3$ type crystal structure; an $A_2B_7$ type crystal structure such as $Ce_2Ni_7$ type crystal structure and $Gd_2Co_7$ type crystal structure; or a crystal structure which is similar to these types. In this case, the term "principal phase" noted above denotes a phase in the alloy which is highest in existing ratio.

If the hydrogen-absorbing alloy represented by the aforementioned general formula is such that, when the alloy is analyzed by an X-ray diffraction method using CuK α-ray, the alloy exhibits a highest peak in the range of $42.1°\pm 1°$ and a peak having an intensity of more than 15% of the aforementioned highest peak in the range of $30.2°\pm 1°$, the alloy contains as a principal phase a phase having a $CaCu_5$ type crystal structure such as $LaNi_5$ type crystal structure, or otherwise the alloy contains such a high ratio of the phase having the $CaCu_5$ type crystal structure that cannot be disregarded just like a principal phase.

If the hydrogen-absorbing alloy contains as a principal phase a phase having a $CaCu_5$ type crystal structure such as $LaNi_5$ type crystal structure, or contains the phase having the $CaCu_5$ type crystal structure at such a high ratio that cannot be disregarded just like a principal phase, it may be impossible to obtain a secondary battery having a sufficient charge/discharge cycle life. A more preferable hydrogen-absorbing alloy among these preferable hydrogen-absorbing alloys is the one where a peak having an intensity of more than 10% of the aforementioned highest peak does not appear in the range of $30.2°±1°$.

A most preferable alloy among the hydrogen-absorbing alloys represented by the aforementioned general formula (A) is such that, when the alloy is analyzed by an X-ray diffraction method using CuK α-ray, the alloy exhibits a highest peak in the range of $42.1°±1°$ and a peak having an intensity greater than 5% of that of the highest peak in the range of $32.5°±1°$ and does not exhibit a peak having an intensity greater than 15% of that of the highest peak in the range of $30.2°±1°$. In particular, it is far more preferable to employ an alloy where a peak having an intensity of more than 10% of the aforementioned highest peak appears in the range of $32.5°±1°$.

The hydrogen-absorbing alloy represented by the aforementioned general formula (A) can be manufactured by means of a casting method, a sintering method, an ultra-quenching method such as a single rolling method, a double rolling method, a disc-atomizing method or a gas-atomizing method.

The alloy thus obtained is then preferably heat-treated in vacuum or in an inert atmosphere at a temperature ranging from 300° C. to less than melting point thereof for a time period ranging from 0.1 to 500 hours. It is possible through this heat treatment to alleviate the distortion in lattice of the alloy, so that the hydrogen absorption/desorption characteristics such as the hydrogen absorption/desorption rate of the alloy can be improved. The heat treatment temperature should preferably be in the range from 750 to 1,050° C., more preferably in the range from 800 to 1,000° C. Further, the heat treatment period should preferably be in the range from 0.5 to 100 hours, more preferably in the range from 1 to 20 hours.

As for the binder, the same kinds of material as employed for the positive electrode can be employed.

As for the conductive material, carbon black, conductive metallic pieces, etc. can be used.

As for the conductive metal for the conductive metallic pieces, Ni, Cu, etc. can be employed. The conductive metallic pieces may be in the form of granule or flake having an average diameter of 1 to 100 $\mu$m. The conductive metallic pieces should preferably be employed at a ratio of 0.3 to 20 parts by weight per 100 parts by weight of a hydrogen-absorbing alloy.

The conductive substrate may be formed of a two-dimensional substrate such as a punched metal, an expanded metal and a nickel net; or a three-dimensional substrate such as a felt-shaped metallic porous body or a sponge-shaped metallic porous body.

(3) The separator 3

There is not any particular limitation regarding the material and configuration of the separator 3 as long as the separator 3 is formed of an insulating material having a sufficient hydrophilicity and gas-permeability. However, in view of enhancing the properties of nickel-hydrogen secondary battery, it should preferably be formed of a sheet. containing a polyolefin type resin fiber.

As for the polyolefin type resin fiber, a fiber consisting of only one kind of polyolefin; a composite fiber of core-sheath structure where a core material consisting of a polyolefin fiber is covered by a different kind of polyolefin fiber; or a composite fiber of split structure where polyolefin fibers which are different in kind from each other are connected with each other to form a ring-like structure may be employed. As for the polyolefin, it is possible to employ polyethylene, polypropylene, etc.

As for the sheet containing a polyolefin type resin fiber, it is possible to employ a non-woven fabric or woven fabric comprising the aforementioned polyolefin type resin fibers, or a composite sheet composed of these non-woven fabric and woven fabric. This non-woven fabric can be manufactured by means of a dry process, a wet process, a spun-bonding method, melt-blow method, etc. The average thickness of the fiber constituting the separator should preferably be in the range of 1 to 20 $\mu$m in view of the mechanical strength and of preventing a short circuit between the positive and negative electrodes.

For the purpose of providing the separator 3 with hydrophilicity, the surface of the polyolefin type resin fiber to be included in the sheet should preferably be covered with a copolymer having a hydrophilic group (such as ethylene vinyl alcohol copolymer), or the sheet should preferably be graft-copolymerized with a vinyl monomer having a hydrophilic group. Examples of vinyl monomer having a hydrophilic group are acrylic acid, methacrylic acid, acrylate, methacrylate, vinylpyridine, vinylpyrrolidone, styrene sulfonic acid, a monomer having a functional group which is capable of forming a salt through a reaction thereof with an acid or base such as styrene, or a monomer having a functional group which is capable of forming a salt through hydrolysis after being graft-copolymerized. Among these vinyl monomers, acrylic acid is most preferable.

(4) Alkaline electrolyte

Examples of the alkaline electrolyte which are useful in this invention include an aqueous solution of potassium hydroxide (KOH), a mixed solution of potassium hydroxide (KOH) and sodium hydroxide (NaOH), a mixed solution of potassium hydroxide (KOH) and lithium hydroxide (LiOH), and a mixed solution of NaOH, KOH and LiOH. In particular, the alkaline electrolyte should preferably be the aqueous mixed solution of NaOH and KOH or the aqueous mixed solution of LiOH and KOH. The concentration of KOH in this alkaline electrolyte should preferably be 2.0 to 9.0N, more preferably 3.0 to.8.5N. Likewise, the concentration of NaOH in this alkaline electrolyte should preferably be 1.0 to 6.0N, more preferably 2.0 to 5.0N. Further, the concentration of LiOH in this alkaline electrolyte should preferably be 0.3 to 2.0N, more preferably 0.5 to 1.5N.

Although this invention has been explained about a cylindrical alkaline secondary battery, it is also possible according to this invention to apply it to a rectangular alkaline secondary battery, wherein a closed-end rectangular case is accommodated therein with an electrode group consisting of a laminated body that positive electrodes and negative electrodes which are alternately superimposed one upon another with a separator being interposed therebetween, and with an alkali electrolyte.

(2) A second nickel-hydrogen secondary battery

The second nickel-hydrogen secondary battery comprises an electrode group comprising a positive electrode, a negative electrode and a separator being interposed positive and negative electrodes. The secondary battery further comprises an alkali electrolyte and a case accommodating therein the aforementioned electrode group and alkali electrolyte.

This second nickel-hydrogen secondary battery is applicable to the cylindrical alkaline secondary battery shown for instance in FIG. 1. Further, this second nickel-hydrogen secondary battery is also applicable to a rectangular alkaline secondary battery, wherein a closed-end rectangular case is accommodated therein with an electrode group consisting of a laminated body that positive electrodes and negative electrodes which are alternately superimposed one upon another with a separator being interposed therebetween, and with an alkali electrolyte.

As for the positive electrode, the negative electrode, the separator and the electrolyte, the same kinds of materials as employed in the aforementioned first nickel-hydrogen secondary battery can be employed.

Followings are explanations on the case (battery case).

This case has a tensile strength of 65 to 80 $kgf/mm^2$, a yield point of 30 to 55 $kgf/mm^2$ and an elastic modulus of 20,000 to 30,000 $kgf/mm^2$.

The measurement of these mechanical properties of the case can be performed based on the method described in JIS Z 2241. The elastic modulus of the case can be calculated based on the data to be obtained from the method described in JIS Z 2241. Further, the test pieces to be employed are those of No. 5 which is described in JIS Z 2201.

Next, the reasons for limiting the mechanical properties of the case to the aforementioned ranges will be explained.

(1) Tensile strength

If the tensile strength of the case is less than 65 $kgf/mm^2$, not only the strength of the case becomes insufficient, but also a plastic deformation such as swelling of the case due to the stress resulting from the volumetric expansion of the negative electrode would be caused. On the other hand, since it is more or less difficult to manufacture the case having a tensile strength exceeding over 80 $kgf/mm^2$ by means of deep draw forming, there is a possibility that cracking or a great magnitude of strain which may be generated in the working of the case. Therefore, a preferable range of the tensile strength of the case is 68 to 75 $kgf/mm^2$.

(2) Yield point

If the yield point of the case is less than 30 $kgf/mm^2$, not only the strength of the case becomes insufficient, but also a plastic deformation such as swelling of the case due to the stress resulting from the volumetric expansion of the negative electrode would be caused. On the other hand, since it is more or less difficult to manufacture the case having a yield point exceeding over 55 $kgf/mm^2$ by means of deep draw forming, there is a possibility that cracking or a great magnitude of strain which may be generated in the working of the case. Therefore, a preferable range of the yield point of the case is 35 to 50 $kgf/mm^2$.

(3) Elastic modulus

As the elastic modulus is increased, a higher stress is required for generating an elastic deformation of the case. Namely, if the elastic modulus of the case exceeds over 30,000 $kgf/mm^2$, the magnitude of elastic deformation of the case in relative to the stress originating from a volumetric expansion of the negative electrode at the occasion of charging would become smaller, thus causing an internal short-circuit to be easily generated. Therefore, a preferable range of the elastic modulus of the case is 21000 to 26000 $kgf/mm^2$.

This case should preferably be formed of a steel plate containing not more than 0.13% (including 0%) of carbon, not more than 0.5% (including 0%) of manganese, not more than 0.05% (including 0%) of phosphorus, and not more than 0.05% (including 0%) of sulfur, at least a part of the surface of the steel plate being preferably plated with nickel. However, it should be noted that all of carbon, manganese, phosphorus and sulfur should not be simultaneously zero.

When the composition of the steel plate is controlled as mentioned above, it becomes possible to obtain a steel plate which is suited for a deep draw forming, and at the same time, the mechanical property of the case can be controlled to a desired range. On the other hand, if the composition of the steel plate falls outside the aforementioned range, it may become difficult to perform the deep draw forming of the case due to an increase in mechanical strength of the steel plate, or the mechanical property of the case may fall outside the aforementioned desired ranges due to a strain originating from the molding of the case.

This case can be manufactured by cold-working such as deep draw forming a plate material having a tensile strength of 25 to 40 $kgf/mm^2$, a yield point of 10 to 30 $kgf/mm^2$ and an elastic modulus of 20,000 to 26,000 $kgf/mm^2$ thereby to form a closed-end cylindrical or square tubular configuration, which is then plated with nickel. This plate material may be formed of a metal such as steel. The purpose of nickel-plating is to enhance the alkali-resistance of the case, and hence this nickel-plating can be performed by any desired method as long as the method does not induce a deterioration of the mechanical and electric properties of the case.

For example, it is possible to adopt a method wherein an electroplating is performed after the plating material is molded into a desired configuration, or a method wherein a plating is performed after the plating material is molded into a desired configuration, subsequently a heat treatment is performed at a temperature lower than the melting point of the plated layer so as to enhance the strength of the plating. Although it is possible to perform a heat treatment during the deep draw forming so as to workability of the plate material, this heat treatment would lead to an increase in manufacturing cost of the case.

(3) A third nickel-hydrogen secondary battery

The third nickel-hydrogen secondary battery comprises an electrode group consisting of a positive electrode, a negative electrode and a separator being interposed positive and negative electrodes. The secondary battery further comprises an alkali electrolyte and a case accommodating therein the aforementioned electrode group and alkali electrolyte.

This third nickel-hydrogen secondary battery is applicable to the cylindrical alkaline secondary battery shown for instance in FIG. 1. Further, this second nickel-hydrogen secondary battery is also applicable to a rectangular alkaline secondary battery, wherein a closed-end rectangular case is accommodated therein with an electrode group consisting of a laminated body that positive electrodes and negative electrodes which are alternately superimposed one upon another with a separator being interposed therebetween, and with an alkali electrolyte.

As for the positive electrode, the separator and the electrolyte, the same kinds of materials as employed in the aforementioned first nickel-hydrogen secondary battery can be employed.

Followings are explanations on the negative electrode.

This negative electrode comprises a mixture containing a hydrogen-absorbing alloy represented by the aforementioned general formula (A), and a conductive substrate carrying this mixture.

This negative electrode can be manufactured by a process wherein a conductive material is added to the powder of the aforementioned hydrogen-absorbing alloy, and the resultant mixture is kneaded together with a binder and water to obtain a paste. The paste is then stuffed into the conductive substrate and, after being dried, press-molded to obtain the negative electrode.

As for the hydrogen-absorbing alloy, the conductive material, the binder and the conductive substrate, the same kinds of materials as employed in the aforementioned first nickel-hydrogen secondary battery can be employed.

In view of inhibiting the self-discharge at the initial stage of the charge/discharge cycle of the battery, the density of the mixture in the negative electrode should be set to 5.1 g/cc to 5.8 g/cc. The reason for the improvement in self-discharge by this density range of the mixture may be ascribed to the fact that this density of the mixture is almost the same as that of hydrogen-absorbing alloy in the negative electrode, thereby giving a great influence to the compression degree of the separator and to the distribution of the electrolyte. More preferable range of the density of the mixture is from 5.2 to 5.7 g/cc.

Next, details of the electrode group will be explained as follows.

In view of inhibiting the self-discharge at the initial stage of the charge/discharge cycle of the battery, the tightness of the electrode group is confined to the range of 98 to 110%. By the way, even if the tightness of the electrode group exceeds over 100%, it is possible to house the electrode group in the case, since the separator can be compressed at the occasion of housing the electrode group in the case. More preferable range of the tightness of the electrode group is from 99 to 105%.

This tightness of the electrode group can be calculated as follows.

(a) Cylindrical nickel-hydrogen secondary battery

First of all, the designed diameter $R_0$ of the electrode group is calculated according to the following formula (I).

$$R_o = T_p \times N_p + T_n \times N_n + T_s \times N_s + r \quad \text{(I)}$$

wherein $T_p$ is the thickness (mm) of the positive electrode before making of the electrode group; $T_n$ is the thickness (mm) of the negative electrode before making of the electrode group; $T_s$ is the thickness (mm) of the separator before making of the electrode group; $N_p$ is the number of segments of the positive electrode which exist in a longitudinal section of the electrode group, taken along a longest diameter thereof; Nn is the number of segments of the negative electrode which exist in the longitudinal section; $N_s$ is the number of segments of the separator which exist in the longitudinal section; and r is the diameter (mm) of the core to be employed in the manufacture of the electrode group.

The number of segments of the positive electrode, the negative electrode and the separator will be explained as follows. FIG. 2 is a cross-sectional view illustrating one example of spiral type electrode group. A longest diameter means a diameter that passing across the end portion of the positive electrode 2 and across a portion of the negative electrode 4 which is superimposed on the aforementioned end portion. In the case of the electrode group shown in FIG. 2, the number of segments of the positive electrode 2 which exit in the longitudinal section is 8, the number of segments of the negative electrode 4 which exit in the longitudinal section is 8, and the number of segments of the separator 3 which exit in the longitudinal section is 20.

By making use of this designed diameter $R_0$ thus obtained, the tightness X(%) is calculated according to the following formula (II).

$$X = (R_0/R_c) \times 100 \quad \text{(II)}$$

wherein $R_c$ is the inner diameter of the closed-end cylindrical case.

(b) Rectangular nickel-hydrogen secondary battery

First of all, the designed thickness $H_0$ of the electrode group is calculated according to the following formula (III).

$$H_0 = T_p \times M_p + T_n \times M_n + T_s \times M_s \quad \text{(III)}$$

wherein $T_p$ is the thickness (mm) of the positive electrode before making of the electrode group; $T_n$ is the thickness (mm) of the negative electrode before making of the electrode group; $T_s$ is the thickness (mm) of the separator before making of the electrode group; $M_p$ is the number of laminated layers of the positive electrode; $M_n$ is the number of laminated layers of the negative electrode; and $M_s$ is the number of laminated layers of the separator.

The number of laminated layers of the positive electrode, the negative electrode and the separator means the number of layers of the positive electrode, the negative electrode and the separator, respectively, each constituting a laminate type electrode group that has been actually manufactured.

By making use of this designed thickness $H_0$ thus obtained, the tightness X(%) is calculated according to the following formula (IV).

$$X = (H_0/H_c) \times 100 \quad \text{(IV)}$$

wherein Hc is the inner width of the closed-end box-like case as measured taking along the laminated direction of the electrode group.

The width of the electrode group having the aforementioned specific tightness should preferably be set to 98 to 100% of the inner width of the case as measured taking along the laminated direction of the electrode group. The reason for limiting the width of the electrode group in this manner is as follows. Namely, if the width of the electrode group in the laminated direction thereof is less than 98%, it may become difficult to inhibit the self-discharge of the nickel-hydrogen secondary battery comprising a negative electrode comprising a hydrogen-absorbing alloy of the aforementioned specific composition. On the other hand, if the width of the electrode group in the laminated direction thereof exceeds over 100%, it may become difficult to house the electrode group in the case. The expression of "the width of the electrode group in the laminated direction" means herein the aforementioned longest diameter of the electrode group in the case of the cylindrical nickel-hydrogen secondary battery, or the thickness of the electrode group in the laminated direction in the case of the rectangular nickel-hydrogen secondary battery. Further, the expression of "the inner width of the case as measured taking along the laminated direction of the electrode group" means, in the case of the cylindrical nickel-hydrogen secondary battery, the inner diameter of the case.

The case housing an electrode group having the aforementioned specific tightness should preferably have a tensile strength of 65 to 80 kgf/mm$^2$, a yield point of 30 to 55 kgf/mm$^2$ and an elastic modulus of 20,000 to 30,000 kgf/mm$^2$.

The first nickel-hydrogen secondary battery according to this invention comprises a negative electrode comprising a hydrogen-absorbing alloy represented by the aforementioned general formula (A). Since the hydrogen absorption capacity per unit volume of this hydrogen-absorbing alloy is about 20% larger than that of LaNi$_5$ type hydrogen-absorbing alloy, it is possible to fabricate a secondary battery of high capacity even if the quantity of this hydrogen-absorbing alloy per theoretical capacity of the positive electrode is reduced. However, the negative electrode containing this hydrogen-absorbing alloy differs from the negative electrode containing the LaNi$_5$ type hydrogen-absorbing alloy in the pulverization rate and in the reactivity with the electrolyte. Therefore, in order to achieve a high battery capacity while ensuring other desired properties of the battery, the battery is required to satisfy the conditions represented by the following formulas (1) and (2).

$$3.2 \leq P \leq 5.0 \quad (1)$$

$$0.9 \leq Q \leq 0.2P+0.7 \quad (2)$$

wherein P is a quantity (g) of the hydrogen-absorbing alloy per theoretical capacity 1 Ah of the positive electrode; and Q is a quantity (mL) of the alkaline electrolyte per theoretical capacity 1 Ah of the positive electrode.

In the case of the closed-type nickel-hydrogen secondary battery where capacity of the positive electrode regulates the battery capacity, it is imperative, for the purpose of enhancing the battery capacity, to increase the quantity of active material of the positive electrode and to reduce the quantity of the active material of the negative electrode. Since the hydrogen absorption capacity per unit volume of this hydrogen-absorbing alloy represented by the aforementioned general formula (A) is larger than that of $LaNi_5$ type hydrogen-absorbing alloy, it is possible to provide a negative electrode having a sufficient capacity even if the quantity of this hydrogen-absorbing alloy is smaller than the quantity of $LaNi_5$ type hydrogen-absorbing alloy. By the way, the properties desired of the nickel-hydrogen secondary battery are not limited to a high battery capacity, but include those which are closely related to the quantity of electrolyte, such as the low temperature discharge property and the internal pressure at the occasion of over-charging. Only when these properties are well-balanced, a secondary battery which is practical and large in capacity can be obtained.

In order to obtain a nickel-hydrogen secondary battery which comprises a negative electrode containing the hydrogen-absorbing alloy represented by the aforementioned general formula (A), and which is capable of exhibiting a large capacity, the quantity P(g) of the hydrogen-absorbing alloy per theoretical capacity 1 Ah of the positive electrode should be the range of 3.2 to 5.0 g. Because if the quantity P(g) of the hydrogen-absorbing alloy is less than 3.2 g, a difference in capacity between the negative electrode and the positive electrode becomes too small, so that the electric potential of the negative electrode may become lowered at the terminal period of discharging of the positive electrode regulating the discharge capacity, thus rendering the capacity at low temperatures in particular in the vicinity of $-20°$ C. to become lower than that of the $LaNi_5$ type hydrogen-absorbing alloy. On the other hand, if the quantity P(g) of the hydrogen-absorbing alloy is more than 5.0 g, the advantage that the hydrogen absorption quantity of the alloy represented by the aforementioned general formula (A) is higher than that of the $LaNi_5$ type hydrogen-absorbing alloy would be dissipated. More preferable range of the quantity P(g) of the hydrogen-absorbing alloy is $3.6 \leq P \leq 4.5$. By the way, the quantity P(g) can be adjusted by modifying the density of alloy of the negative electrode.

The quantity Q(mL) of the alkaline electrolyte per theoretical capacity 1 Ah of the positive electrode in the nickel-hydrogen secondary battery comprising a negative electrode containing the hydrogen-absorbing alloy represented by the aforementioned general formula (A) should be selected so as to meet the condition represented by the aforementioned formula (2).

The reason for limiting the quantity Q(mL) of the alkaline electrolyte to the range defined by the aforementioned formula (2) is as follows. Namely, if the quantity Q(mL) of the alkaline electrolyte is less than 0.9 mL, it would be impossible to uniformly disperse the electrolyte in the negative electrode. As a result, the capacity at low temperatures in particular in the vicinity of $-20°$ C. would be prominently deteriorated. On the other hand, if the quantity Q(mL) of the alkaline electrolyte is more than the value calculated from 0.2P+0.7 (P is a quantity (g) of the hydrogen-absorbing alloy per theoretical capacity 1 Ah of the positive electrode), the internal pressure of the battery would be increased, thus making it impossible to obtain a sufficient charge/discharge cycle life. This quantity of electrolyte is closely related to the quantity of the alloy as seen from the formula (2).

In order to suppress any increase in internal pressure of the battery, the oxygen gas generated at the occasion of over-charging is required to be quickly diffused over the surface of the alloy existing in the negative electrode, so that it is required to secure a space between the alloy particles for a gas passageway where no electrolyte is existed therein. Therefore, the quantity of electrolyte per weight of the alloy becomes approximately constant, thus assumably allowing the aforementioned relational expression to be established. Therefore, this relational expression indicates the upper limit in quantity of the electrolyte which obviates the increase of internal pressure in the nickel-hydrogen secondary battery comprising a negative electrode containing the alloy in a quantity meeting the aforementioned formula (1). More preferable range of the quantity Q(mL) of the electrolyte is $0.95 \leq Q \leq 0.2P+0.6$.

According to the first nickel-hydrogen secondary battery of this invention, since the battery comprises a negative electrode containing the hydrogen-absorbing alloy represented by the aforementioned general formula (A), and since the quantity of the hydrogen-absorbing alloy in relative to the theoretical capacity of the positive electrode as well as the quantity of the alkaline electrolyte in relative to theoretical capacity of the positive electrode are both controlled according to the formulas (1) and (2), it is now possible to enhance the battery capacity while ensuring the properties desired of the battery such as the low temperature discharge property, the internal pressure, the charge/discharge cycle, etc.

In particular, when the hydrogen-absorbing alloy exhibits a highest peak in the range of $42.1°\pm1°$ and does not exhibit a peak having an intensity greater than 15% of that of the highest peak in the range of $30.2°\pm1°$ as measured by X-ray diffraction using CuK α-ray, it is possible not only to enhance the capacity of the secondary battery without damaging other desired properties, but also to improve the charge/discharge cycle life of the secondary battery. Further, when the hydrogen-absorbing alloy further exhibits a peak having an intensity of more than 5% of the highest peak in the range of $32.5°\pm1°$, it is possible to further improve the charge/discharge cycle life of the secondary battery.

According to the second nickel-hydrogen secondary battery of this invention, any volumetric changes due to the expansion and shrinkage of the negative electrode containing the hydrogen-absorbing alloy represented by the aforementioned general formula (A) at the occasion of charging and discharging can be absorbed by an elastic deformation of the case. As a result, the electrode group including the negative electrode can be inhibited from being oppressed by the case at the occasion of the expansion of the negative electrode, so that the space balance inside the electrode group can be maintained in a desired condition. Accordingly, the secondary battery can be prevented, at a relatively early stage of charge/discharge cycle, from generating an internal short-circuit, from decreasing quantity of electrolyte due to the actuation of safety valve due to an increase of internal pressure, or from decreasing effective quantity of electrolyte due to an irreversible expansion of the case. Therefore, it is possible to prevent the deterioration of discharge capacity at a relatively early stage of charge/discharge cycle and also to enhance the charge/discharge cycle life of the battery.

In particular, when the hydrogen-absorbing alloy exhibits a highest peak in the range of 42.1°±1° and does not exhibit a peak having an intensity greater than 15% of that of the highest peak in the range of 30.2°±1° as measured by X-ray diffraction using CuK α-ray, it is possible not only to prevent the battery from generating an internal short-circuit or increasing internal pressure at a relatively early stage of charge/discharge cycle, but also to enhance the charge/discharge cycle life of the battery. Further, when the hydrogen-absorbing alloy further exhibits a peak having an intensity of more than 5% of the highest peak in the range of 32.5°±1°, it is possible to further improve the charge/discharge cycle life of the secondary battery.

According to the third nickel-hydrogen secondary battery of this invention, since not only the density of the mixture containing the hydrogen-absorbing alloy represented by the aforementioned general formula (A) but also the tightness of the electrode group fall within specific ranges respectively, it is possible to suppress the self-discharging at the initial stage of the charge/discharge cycle of the nickel-hydrogen secondary battery comprising a negative electrode containing the hydrogen-absorbing alloy represented by the aforementioned general formula (A). The reason for this may be explained as follows.

In the case of a nickel-hydrogen secondary battery, a hydrogen partial pressure corresponding to the equilibrium pressure of the hydrogen-absorbing alloy contained in a negative electrode is retained in the case during the storage thereof. This phenomenon occurs inevitably in the case of the nickel-hydrogen secondary battery comprising the negative electrode containing the hydrogen-absorbing alloy. In the case of a closed type secondary battery, when this hydrogen is contacted with a positive electrode, the charge-reaction product of the positive electrode such as nickel oxyhydroxide is reduced, thus allowing a self-discharging reaction to proceed. This self-discharging reaction is further promoted as the ambient temperature of storage becomes higher. This self-discharging reaction can be effectively suppressed by reducing the chance of reaction between the charged positive electrode and the gaseous hydrogen. As one of the methods to reduce this chance of contact between them, there is known a method wherein the hydrophilicity of the separator is enhanced, thereby increasing the electrolyte retention quantity of the separator and hence filling the voids of the separator with the electrolyte, and at the same time, the wettability of the surface of the positive electrode is enhanced, thus inhibiting the diffusion of the hydrogen gas.

It has been found as a result of intensive study made by the present inventors that the hydrogen-absorbing alloy represented by the aforementioned general formula (A) indicates more prominent volumetric change at the occasion of charging/discharging as compared with the known alloys, and hence the magnitude of self-discharging reaction is more changeable at the initial period of the charge/discharge cycle. Based on this findings, the present inventors have further found that the self-discharging reaction can be suppressed by optimizing not only the density of the mixture of the negative electrode but also the construction of the electrode group. Thus, it has been found that the self-discharging reaction at the initial period of the charge/discharge cycle can be suppressed by taking into account the volumetric change accompanying the charging/discharging of the negative electrode containing the hydrogen-absorbing alloy represented by the aforementioned general formula (A) at the occasion of designing the negative electrode and the electrode group.

Namely, when the negative electrode is expanded due to the charging of the secondary battery, the separator is compressed. As a result of this compression of the separator, the voids inside the separator and the quantity of electrolyte are caused to change, and hence the magnitude in proceeding of the self-discharging reaction is also altered. The magnitude of expansion and shrinkage of the negative electrode is greatly influenced by the ratio in volumetric change of a hydrogen-absorbing alloy to be employed, and this ratio in volumetric change differs depending on the kinds of the hydrogen-absorbing alloy. In other words, the composition of the hydrogen-absorbing alloy, the density of the mixture of the negative electrode and the tightness of the electrode group are closely interrelated with each other. Accordingly, it is possible, in the nickel-hydrogen secondary battery comprising an negative electrode containing the hydrogen-absorbing alloy represented by the aforementioned general formula (A), to suppress the self-discharging by confining the density of the mixture in the negative electrode to 5.1 g/cc to 5.8 g/cc, and also confining the tightness of the electrode group to the range of 98 to 110%.

Namely, if the density of the mixture in the negative electrode is less than 5.1 g/cc, the compression of the separator becomes insufficient, thus making it difficult to minimize the void in the separator. On the other hand, if the density of the mixture in the negative electrode is more than 5.8 g/cc, even though it may be possible to reduce the void in the separator due to the expansion of the alloy as a result of charging, the gap between the particles of alloy in the negative electrode is enlarged, thus allowing the electrolyte in the separator to move into the gap. As a result, the retention of the electrolyte by the separator would be reduced, thus making it impossible to sufficiently fill the void in the separator with the electrolyte, and hence the magnitude of self-discharging would be increased.

On the other hand, if the tightness of the electrode group is less than 98%, the compression of the separator by the expansion of the negative electrode resulting from charging would become insufficient, thus enlarging the void in the separator. As a result, it becomes impossible to suppress the diffusion of hydrogen gas, and hence the self-discharging may be prominently proceed. On the other hand, if the tightness of the electrode group is more than 110%, even though it may be possible to strongly compress the separator thereby to minimize the void in the separator, the quantity of electrolyte in the separator would be reduced, thus promoting the process of self-discharge.

Therefore, it is now possible according to this invention to inhibit the self-discharge of the nickel-hydrogen secondary battery comprising a negative electrode containing the hydrogen-absorbing alloy represented by the aforementioned general formula (A).

Since the width of the electrode group along the laminated direction thereof is set to 98 to 100% of the inner width of the case as taken along the laminated direction of the electrode group, it is now possible to smoothly house the electrode group into the case and, at the same time, to further inhibit the self-discharge of the nickel-hydrogen secondary battery.

Further, when the hydrogen-absorbing alloy exhibits a highest peak in the range of 42.1°±1° and does not exhibit a peak having an intensity greater than 15% of that of the highest peak in the range of 30.2°±1° as measured by X-ray diffraction using CuK α-ray, it is now possible not only to improve the self-discharge-inhibiting property of the secondary battery, but also to improve the charge/discharge cycle life of the secondary battery. Further, when the hydrogen-absorbing alloy further exhibits a peak having an intensity of more than 5% of the aforementioned highest peak in the range of 32.5°±1°, it is now possible to further improve the charge/discharge cycle life of the secondary battery.

Next, the examples of this invention will be explained in detail as follows with reference to drawings.

EXAMPLES 1–25 AND COMPARATIVE EXAMPLES 1–12

<Preparation of a negative electrode>

By making use of a high frequency furnace, a hydrogen-absorbing alloy having a composition of $(La_{0.7}Mg_{0.3})Ni_{2.5}Co_{0.5}$ was obtained. The alloy thus obtained was then homogenized in an argon atmosphere by heat-treating it at a temperature of 900° C. This hydrogen-absorbing alloy was then subjected to an X-ray diffraction analysis using CuK α-ray to obtain a diffraction chart shown in FIG. 3.

Figure 3:
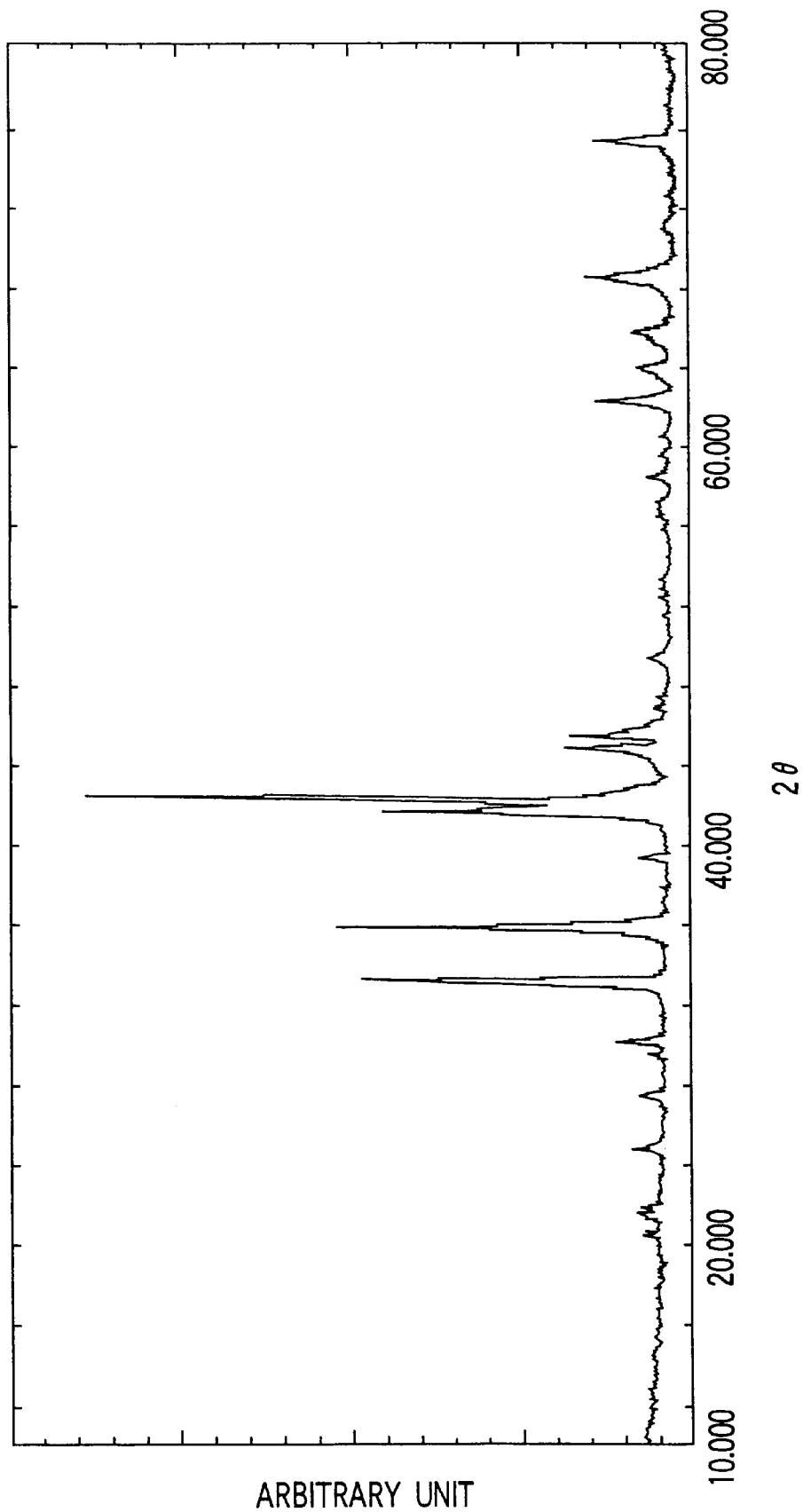
FIG. 3 is a chart as obtained in an X-ray diffraction analysis using CuK α-ray on the hydrogen-absorbing alloy contained in the negative electrode of nickel-hydrogen secondary batteries according to Example 1.

As seen from FIG. 3, the hydrogen-absorbing alloy thus obtained indicated a highest peak in the range of 42.1°±1°, a peak having an intensity of 8.8% of the aforementioned highest peak in the range of 30.2°±1° and a peak having an intensity of 56% of the aforementioned highest peak in the range of 32.5°±1°. It should be noted that the intensity of each peak is one obtained by subtracting the intensity of the background from the intensity of the peak actually measured.

This hydrogen-absorbing alloy was then pulverized in an inert atmosphere, and subsequently sieved to select alloy powder having particle sizes ranging from 400 mesh to 200 mesh. Then, 100 parts by weight of the hydrogen-absorbing alloy powder was mixed with 0.5 part by weight of nickel powder which was prepared by means of carbonyl process and available in the market thereby to obtain a mixture. Thereafter, to 100 parts by weight of this mixture was added 25 parts by weight of a 4% aqueous solution of polyvinyl alcohol thereby to obtain a paste. The paste was then stuffed into a nickel foamed substrate employed as a conductive substrate, and the resultant substrate was then press-molded to obtain a paste type negative electrode.

<Preparation of positive electrode>

First of all, 90 parts by weight of nickel hydroxide powder and 10 parts by weight of cobalt oxide powder were mixed together to obtain a mixture, which was then mixed with 0.15 part by weight of carboxymethyl cellulose, 0.15 part by weight of sodium polyacrylate and 0.5 part by weight (reduced to solid matter) of a dispersion of polytetrafluoroethylene (1.5 in specific gravity and 60 wt % in solid matter) to obtain a mixed solution. Subsequently, 45% by weight of water was further added to the above mixed solution and the resultant mixture was kneaded to prepare a paste. Then, this paste was filled in a nickel-plated fibrous substrate and, after being dried, the substrate was rolled by making use of a roller press to manufacture a paste-type nickel positive electrode.

<Preparation of separator>

A polypropylene non-woven fabric was manufactured from polypropylene resin by means of a spun-bonding method. Then, the resultant non-woven fabric was dipped into an aqueous solution of acrylic acid and then irradiated with ultraviolet rays to graft-polymerize the non-woven fabric with acrylic monomer. Thereafter, the resultant non-woven fabric was washed to remove any unreacted acrylic acid and then dried to obtain a separator having a weight per unit area of 50 g/m².

The negative electrode and the positive electrode thus prepared was spirally wound with the aforementioned separator being interposed therebetween thereby to obtain an electrode group. In this case, the volumetric ratio between the positive electrode and the negative electrode was set such that the capacity of the positive electrode regulates the discharge capacity. Then, this electrode group and an electrolyte consisting of 2.75N of KOH, 4.75N of NaOH and 1N of LiOH were placed in a closed-end cylindrical case thereby to assembling an AA size cylindrical nickel-hydrogen secondary battery having a structure as shown in FIG. 1.

The quantity P(g) of the hydrogen-absorbing alloy per theoretical capacity 1 Ah of the positive electrode and the quantity Q(mL) of the alkaline electrolyte per theoretical capacity 1 Ah of the positive electrode in the secondary battery thus obtained are shown in the following Tables 1 to 3.

COMPARATIVE EXAMPLE 13

By making use of a high frequency furnace, a hydrogen-absorbing alloy represented by a composition of $Mm_{1.0}Ni_{4.0}Co_{0.4}Mn_{0.3}Al_{0.3}$ (Mm is a lanthanum-rich misch-metal) was obtained. The alloy thus obtained was then homogenized in an argon atmosphere by heat-treating it at a temperature of 1000° C. This hydrogen-absorbing alloy was then subjected to an X-ray diffraction analysis using CuK α-ray to find that the hydrogen-absorbing alloy thus obtained indicated a highest peak in the range of 42.1°±1°, a peak having an intensity of 52% of the aforementioned highest peak in the range of 30.2°±1°. However, a peak having an intensity of more than 5% of the aforementioned highest peak was not recognized in the range of 32.5°±1°. It should be noted that the intensity of each peak is one obtained by subtracting the intensity of the background from the intensity of the peak actually measured. As a result, this hydrogen-absorbing alloy was admitted as containing a phase having a $LaNi_5$ type crystal structure as a principle phase.

Then, a cylindrical nickel-hydrogen secondary battery was assembled in the same manner as that of Example 13 except that the aforementioned hydrogen-absorbing alloy was employed herein.

COMPARATIVE EXAMPLE 14

A cylindrical nickel-hydrogen secondary battery was assembled in the same manner as that of Comparative Example 11 except that the same hydrogen-absorbing alloy as explained in Comparative Example 13 was also employed herein.

Each of the secondary batteries obtained from Examples 1 to 25 and Comparative Examples 1 to 14 was activated and then subjected to a charge/discharge cycle at a temperature of 20° C. wherein each battery was charged to a depth of 150% with a current of 1C, and, after 30 minutes of cut-off, discharged with 1C until the voltage was lowered down to 1.1V. In this case, a discharge capacity was measured at the 20th cycle. The discharge capacity of each sample was indicated in comparison with the value of discharge capacity of Example 13 which was defined as 100, the results being shown in Tables 1 to 3.

Further, each of the secondary batteries obtained from Examples 1 to 25 and Comparative Examples 1 to 14 was charged to a depth of 150% with a current of 1C, and, after being sufficiently cooled in a thermostat of −20° C., discharged with 0.3C under the condition of −20° C. until the voltage of battery was lowered down to 1.1V, upon which the discharge capacity of the battery was measured. The discharge capacity of each sample was indicated in comparison with the value of discharge capacity of Example 13 which was defined as 100, the results being shown in Tables 1 to 3.

Further, each of the secondary batteries obtained from Examples 1 to 25 and Comparative Examples 1 to 14 was measured with regard to the internal pressure thereof. The measurement of internal pressure of these secondary batteries was performed by placing respectively the secondary batteries of Examples 1 to 25 and Comparative Examples 1 to 14 in the case of a pressure-measuring apparatus shown in FIG. 4.

As shown in FIG. 4, each pressure-measuring apparatus is provided with a main case body 21 and a cap 22, both being made of acrylic resin. The main case body 21 is provided at the center thereof with a space 23 having the same inner diameter and the same height as those of the metallic case of the AA size battery, so as to allow each of these batteries 24 to be placed in the interior of this space 23. This battery 24 is placed in this space 23 in a state that the top of the closed-end cylindrical case is left open without being attached with a sealing plate. The top surface of the main case body 21 is hermetically closed with the cap 22, which is fixed, via a packing 25 and an O-ring 26, to the main case body 21 by making use of bolts 27 and nuts 28. A pressure detector 29 is attached to the cap 22. The lead 30 extending from the negative electrode and the lead 31 extending from the positive electrode are lead out through a space between the packing 25 and the O-ring 26.

By making use of this internal pressure-measuring apparatus, a maximum internal pressure of battery at the moment where each of the secondary batteries of Examples 1 to 25 and Comparative Examples 1 to 14 was charged to a depth of 480% with a current of 0.5C was measured, the results being shown in the following Tables 1 to 3.

Figure 5:
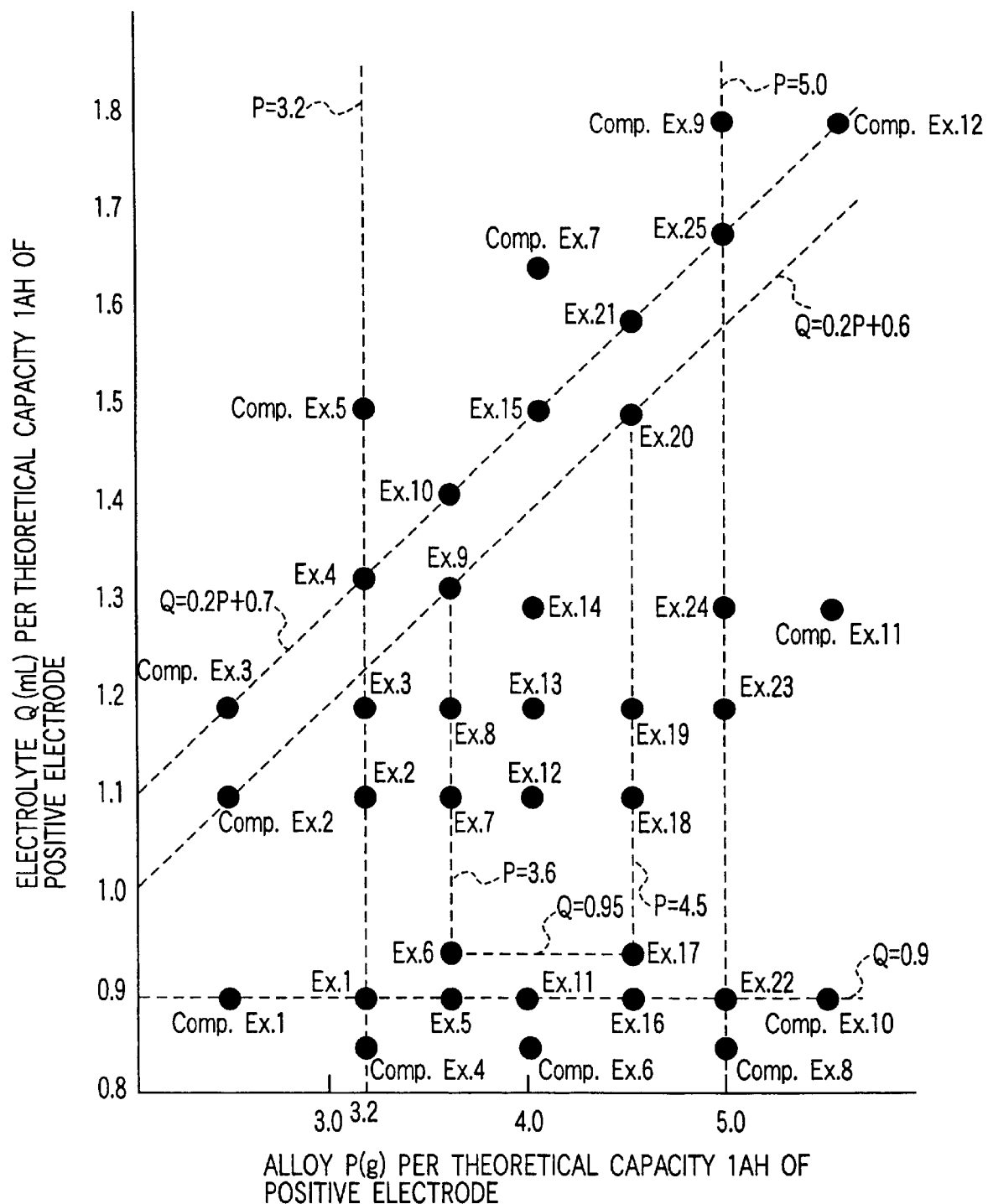
FIG. 5 is a graph illustrating a relationship between the quantity P(g) of the hydrogen-absorbing alloy per theoretical capacity 1 Ah of the positive electrode and the quantity Q(mL) of the alkaline electrolyte per theoretical capacity 1 Ah of the positive electrode in the nickel-hydrogen secondary batteries according to Examples 1 to 25 and Comparative Examples 1 to 12.

Further, a relationship between the quantity P(g) of the hydrogen-absorbing alloy per theoretical capacity 1 Ah of the positive electrode and the quantity Q(mL) of the electrolyte per theoretical capacity 1 Ah of the positive electrode was plotted on each of the nickel-hydrogen secondary batteries of Examples 1 to 25 and Comparative Examples 1 to 12, the results being shown in FIG. 5.

TABLE 1

| | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
|---|---|---|---|---|---|---|---|
| Example 1 | La—Mg—Ni type | 3.2 | 1.34 | 0.90 | 91 | 89 | 1.0 |
| Example 2 | La—Mg—Ni type | 3.2 | 1.34 | 1.10 | 92 | 91 | 2.0 |
| Example 3 | La—Mg—Ni type | 3.2 | 1.34 | 1.20 | 92 | 92 | 3.0 |
| Example 4 | La—Mg—Ni type | 3.2 | 1.34 | 1.34 | 92 | 93 | 4.7 |
| Example 5 | La—Mg—Ni type | 3.6 | 1.42 | 0.90 | 94 | 92 | 1.1 |
| Example 6 | La—Mg—Ni type | 3.6 | 1.42 | 0.95 | 98 | 96 | 1.5 |
| Example 7 | La—Mg—Ni type | 3.6 | 1.42 | 1.10 | 98 | 98 | 2.0 |
| Example 8 | La—Mg—Ni type | 3.6 | 1.42 | 1.20 | 99 | 99 | 3.1 |
| Example 9 | La—Mg—Ni type | 3.6 | 1.42 | 1.32 | 99 | 98 | 4.0 |
| Example 10 | La—Mg—Ni type | 3.6 | 1.42 | 1.42 | 99 | 100 | 5.5 |
| Example 11 | La—Mg—Ni type | 4.0 | 1.50 | 0.90 | 94 | 93 | 2.0 |
| Example 12 | La—Mg—Ni type | 4.0 | 1.50 | 1.10 | 100 | 99 | 2.5 |
| Example 13 | La—Mg—Ni type | 4.0 | 1.50 | 1.20 | 100 | 100 | 3.5 |

TABLE 2

| | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
|---|---|---|---|---|---|---|---|
| Example 14 | La—Mg—Ni type | 4.0 | 1.50 | 1.30 | 100 | 100 | 4.5 |
| Example 15 | La—Mg—Ni type | 4.0 | 1.50 | 1.50 | 100 | 101 | 5.8 |
| Example 16 | La—Mg—Ni type | 4.5 | 1.60 | 0.90 | 94 | 93 | 2.0 |
| Example 17 | La—Mg—Ni type | 4.5 | 1.60 | 0.95 | 98 | 97 | 2.5 |
| Example 18 | La—Mg—Ni type | 4.5 | 1.60 | 1.10 | 99 | 99 | 2.8 |
| Example 19 | La—Mg—Ni type | 4.5 | 1.60 | 1.20 | 100 | 100 | 3.6 |
| Example 20 | La—Mg—Ni type | 4.5 | 1.60 | 1.50 | 99 | 100 | 4.9 |
| Example 21 | La—Mg—Ni type | 4.5 | 1.60 | 1.60 | 99 | 101 | 6.0 |
| Example 22 | La—Mg—Ni type | 5.0 | 1.70 | 0.90 | 93 | 91 | 2.8 |
| Example 23 | La—Mg—Ni type | 5.0 | 1.70 | 1.20 | 93 | 93 | 4.6 |
| Example 24 | La—Mg—Ni type | 5.0 | 1.70 | 1.30 | 93 | 94 | 5.2 |
| Example 25 | La—Mg—Ni type | 5.0 | 1.70 | 1.70 | 93 | 95 | 6.5 |

TABLE 3

| | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
|---|---|---|---|---|---|---|---|
| Comparative Example 1 | La—Mg—Ni type | 2.5 | — | 0.90 | 70 | 55 | 0.8 |
| Comparative Example 2 | La—Mg—Ni type | 2.5 | — | 1.10 | 75 | 60 | 4.5 |
| Comparative Example 3 | La—Mg—Ni type | 2.5 | — | 1.20 | 75 | 65 | 6.5 |
| Comparative Example 4 | La—Mg—Ni type | 3.2 | 1.34 | 0.85 | 80 | 72 | 1.0 |
| Comparative Example 5 | La—Mg—Ni type | 3.2 | 1.34 | 1.50 | 100 | 97 | 12.2 |
| Comparative Example 6 | La—Mg—Ni type | 4.0 | 1.50 | 0.85 | 80 | 72 | 0.9 |
| Comparative Example 7 | La—Mg—Ni type | 4.0 | 1.50 | 1.65 | 100 | 100 | 12.5 |
| Comparative Example 8 | La—Mg—Ni type | 5.0 | 1.70 | 0.85 | 80 | 74 | 1.7 |
| Comparative Example 9 | La—Mg—Ni type | 5.0 | 1.70 | 1.80 | 100 | 99 | 13.0 |
| Comparative Example 10 | La—Mg—Ni type | 5.5 | — | 0.90 | 80 | 70 | 1.2 |
| Comparative Example 11 | La—Mg—Ni type | 5.5 | — | 1.30 | 80 | 75 | 6.2 |
| Comparative Example 12 | La—Mg—Ni type | 5.5 | — | 1.80 | 82 | 78 | 16.0 |
| Comparative Example 13 | MmNi$_5$ type | 4.0 | 1.50 | 1.20 | 80 | 75 | 4.5 |
| Comparative Example 14 | MmNi$_5$ type | 5.5 | — | 1.30 | 82 | 76 | 11.0 |

As seen from Tables 1 to 3 and FIG. 5, the secondary batteries of Examples 1 to 25 each having a suitable quantity P(g) of the hydrogen-absorbing alloy and a suitable quantity Q(mL) of the electrolyte, i.e. both quantities falling within the region encircled by four straight lines; Q=0.9, Q=0.2P+0.7, P=3.2, P=5.0, were found satisfactory in all of discharge capacity, low temperature discharge property and internal pressure property.

Whereas in the case of the secondary batteries of Comparative Examples 1 to 12 wherein both of the quantity P(g) of the hydrogen-absorbing alloy and the quantity Q(mL) of the electrolyte fall out of the aforementioned region were found unsatisfactory in at least one of the aforementioned three properties, i.e. discharge capacity, low temperature discharge property and internal pressure property.

On the other hand, in the case of the secondary battery of Comparative Example 13 which comprised a negative electrode containing a hydrogen-absorbing alloy having a MmNi$_5$ type composition and containing a phase having a LaNi$_5$ type crystal structure as a principle phase, even though the quantity P(g) and the quantity Q(mL) were both existed within the aforementioned region, the discharge capacity and low temperature discharge property thereof were found as being almost the same as those of the secondary battery of Comparative Example 14 where the quantity P(g) and the quantity Q(mL) were both existed outside the aforementioned region.

Therefore, it will be understood that as long as a hydrogen-absorbing alloy to be employed has a MmNi$_5$ type composition and contains a phase having a LaNi$_5$ type crystal structure as a principle phase, it would be impossible, even if the quantity P(g) and quantity Q(mL) are suitably regulated, to obtain a secondary battery which is satisfactory in all of discharge capacity, low temperature discharge property and internal pressure property.

Each of the secondary batteries obtained from Examples 3, 13, 23 and Comparative Example 13 was subjected to a charge/discharge cycle at a temperature of 20° C. wherein each battery was charged to a depth of 150% with a current of 1C, and, after 30 minutes of cut-off, discharged with 1C until the voltage was lowered down to 1.1V. In this case, the number of cycle when the discharge capacity was lowered to 80% of the discharge capacity at moment of the first cycle was measured, the results being shown in Table 4.

TABLE 4

| | Cycle life |
|---|---|
| Example 3 | 780 |
| Example 13 | 810 |
| Example 23 | 680 |
| Comparative Example 13 | 490 |

As seen from Table 4, the secondary batteries of Examples 3, 13 and 23 were found superior in charge/discharge cycle life as compared with the secondary battery of Comparative Example 13.

EXAMPLES 26–50 AND COMPARATIVE EXAMPLES 15–28

The batteries of Examples 26–50 and Comparative Examples 15–28 were prepared in the same manner as those of Examples 1–25 and Comparative Examples 1–14 except that the weight per unit area of the separator was altered to 40 g/m$^2$.

In the same manner as described above, the discharge capacity at the normal temperature, the discharge capacity at a low temperature and the maximum internal pressure were measured using the batteries of Examples 26–50 and Comparative Examples 15–28, the results being shown in the following Tables 5 to 7. By the way, the discharge capacity of each secondary battery at normal temperature was indicated in comparison with the discharge capacity measured at normal temperature of the secondary battery of Example 13, which was defined as 100. Further, the discharge capacity of each secondary battery at the low temperature was indicated in comparison with the discharge capacity measured at the low temperature of the secondary battery of Example 13, which was defined as 100.

TABLE 5

|  | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
|---|---|---|---|---|---|---|---|
| Example 26 | La—Mg—Ni type | 3.2 | 1.34 | 0.90 | 92 | 90 | 0.7 |
| Example 27 | La—Mg—Ni type | 3.2 | 1.34 | 1.10 | 93 | 92 | 1.8 |
| Example 28 | La—Mg—Ni type | 3.2 | 1.34 | 1.20 | 93 | 93 | 2.7 |
| Example 29 | La—Mg—Ni type | 3.2 | 1.34 | 1.34 | 93 | 95 | 4.5 |
| Example 30 | La—Mg—Ni type | 3.6 | 1.42 | 0.90 | 95 | 96 | 0.8 |
| Example 31 | La—Mg—Ni type | 3.6 | 1.42 | 0.95 | 99 | 97 | 1.2 |
| Example 32 | La—Mg—Ni type | 3.6 | 1.42 | 1.10 | 99 | 99 | 1.7 |
| Example 33 | La—Mg—Ni type | 3.6 | 1.42 | 1.20 | 100 | 100 | 2.8 |
| Example 34 | La—Mg—Ni type | 3.6 | 1.42 | 1.32 | 100 | 99 | 3.6 |
| Example 35 | La—Mg—Ni type | 3.6 | 1.42 | 1.42 | 101 | 102 | 5.0 |
| Example 36 | La—Mg—Ni type | 4.0 | 1.50 | 0.90 | 95 | 94 | 1.8 |
| Example 37 | La—Mg—Ni type | 4.0 | 1.50 | 1.10 | 101 | 99 | 2.2 |
| Example 38 | La—Mg—Ni type | 4.0 | 1.50 | 1.20 | 101 | 101 | 3.1 |

TABLE 6

|  | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
|---|---|---|---|---|---|---|---|
| Example 39 | La—Mg—Ni type | 4.0 | 1.50 | 1.30 | 101 | 101 | 4.0 |
| Example 40 | La—Mg—Ni type | 4.0 | 1.50 | 1.50 | 101 | 102 | 5.5 |
| Example 41 | La—Mg—Ni type | 4.5 | 1.60 | 0.90 | 95 | 94 | 1.8 |
| Example 42 | La—Mg—Ni type | 4.5 | 1.60 | 0.95 | 99 | 98 | 2.3 |
| Example 43 | La—Mg—Ni type | 4.5 | 1.60 | 1.10 | 100 | 100 | 2.5 |
| Example 44 | La—Mg—Ni type | 4.5 | 1.60 | 1.20 | 101 | 102 | 3.3 |
| Example 45 | La—Mg—Ni type | 4.5 | 1.60 | 1.50 | 100 | 102 | 4.7 |
| Example 46 | La—Mg—Ni type | 4.5 | 1.60 | 1.60 | 100 | 102 | 5.8 |
| Example 47 | La—Mg—Ni type | 5.0 | 1.70 | 0.90 | 94 | 92 | 2.6 |
| Example 48 | La—Mg—Ni type | 5.0 | 1.70 | 1.20 | 94 | 94 | 4.4 |
| Example 49 | La—Mg—Ni type | 5.0 | 1.70 | 1.30 | 94 | 95 | 5.0 |
| Example 50 | La—Mg—Ni type | 5.0 | 1.70 | 1.70 | 94 | 96 | 6.2 |

TABLE 7

|  | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
|---|---|---|---|---|---|---|---|
| Comparative Example 15 | La—Mg—Ni type | 2.5 | — | 0.90 | 72 | 57 | 0.6 |
| Comparative Example 16 | La—Mg—Ni type | 2.5 | — | 1.10 | 75 | 61 | 4.0 |
| Comparative Example 17 | La—Mg—Ni type | 2.5 | — | 1.20 | 76 | 67 | 6.1 |
| Comparative Example 18 | La—Mg—Ni type | 3.2 | 1.34 | 0.85 | 81 | 74 | 0.9 |
| Comparative Example 19 | La—Mg—Ni type | 3.2 | 1.34 | 1.50 | 101 | 98 | 11.5 |
| Comparative Example 20 | La—Mg—Ni type | 4.0 | 1.50 | 0.85 | 80 | 74 | 0.8 |
| Comparative Example 21 | La—Mg—Ni type | 4.0 | 1.50 | 1.65 | 100 | 101 | 11.6 |
| Comparative Example 22 | La—Mg—Ni type | 5.0 | 1.70 | 0.85 | 80 | 76 | 0.8 |
| Comparative Example 23 | La—Mg—Ni type | 5.0 | 1.70 | 1.80 | 101 | 100 | 12.2 |
| Comparative Example 24 | La—Mg—Ni type | 5.5 | — | 0.90 | 81 | 72 | 1.1 |

TABLE 7-continued

| | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
|---|---|---|---|---|---|---|---|
| Comparative Example 25 | La—Mg—Ni type | 5.5 | — | 1.30 | 81 | 75 | 5.7 |
| Comparative Example 26 | La—Mg—Ni type | 5.5 | — | 1.80 | 82 | 79 | 15.4 |
| Comparative Example 27 | MmNi$_5$ type | 4.0 | 1.50 | 1.20 | 81 | 77 | 3.8 |
| Comparative Example 28 | MmNi$_5$ type | 5.5 | — | 1.30 | 82 | 77 | 9.8 |

EXAMPLES 51–75 AND COMPARATIVE EXAMPLES 29–42

The batteries of Examples 51–75 and Comparative Examples 29–42 were prepared in the same manner as those of Examples 1–25 and Comparative Examples 1–14 except that the conductive substrate of the negative electrode was changed to a punched metal.

In the same manner as described above, the discharge capacity at the normal temperature, the discharge capacity at a low temperature and the maximum internal pressure were measured using the batteries of Examples 51–75 and Comparative Examples 29–42, the results being shown in the following Tables 8 to 10. By the way, the discharge capacity of each secondary battery at normal temperature was indicated in comparison with the discharge capacity measured at normal temperature of the secondary battery of Example 13, which was defined as 100. Further, the discharge capacity of each secondary battery at the low temperature was indicated in comparison with the discharge capacity measured at the low temperature of the secondary battery of Example 13, which was defined as 100.

TABLE 8

| | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
|---|---|---|---|---|---|---|---|
| Example 51 | La—Mg—Ni type | 3.2 | 1.34 | 0.90 | 90 | 89 | 0.9 |
| Example 52 | La—Mg—Ni type | 3.2 | 1.34 | 1.10 | 92 | 91 | 1.9 |
| Example 53 | La—Mg—Ni type | 3.2 | 1.34 | 1.20 | 92 | 92 | 3.0 |
| Example 54 | La—Mg—Ni type | 3.2 | 1.34 | 1.34 | 92 | 93 | 4.7 |
| Example 55 | La—Mg—Ni type | 3.6 | 1.42 | 0.90 | 94 | 92 | 1.1 |
| Example 56 | La—Mg—Ni type | 3.6 | 1.42 | 0.95 | 98 | 96 | 1.5 |
| Example 57 | La—Mg—Ni type | 3.6 | 1.42 | 1.10 | 97 | 98 | 2.0 |
| Example 58 | La—Mg—Ni type | 3.6 | 1.42 | 1.20 | 99 | 99 | 3.1 |
| Example 59 | La—Mg—Ni type | 3.6 | 1.42 | 1.32 | 99 | 98 | 3.7 |
| Example 60 | La—Mg—Ni type | 3.6 | 1.42 | 1.42 | 98 | 99 | 5.5 |
| Example 61 | La—Mg—Ni type | 4.0 | 1.50 | 0.90 | 94 | 93 | 2.0 |
| Example 62 | La—Mg—Ni type | 4.0 | 1.50 | 1.10 | 100 | 99 | 2.4 |
| Example 63 | La—Mg—Ni type | 4.0 | 1.50 | 1.20 | 99 | 100 | 3.5 |

TABLE 9

| | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
|---|---|---|---|---|---|---|---|
| Example 64 | La—Mg—Ni type | 4.0 | 1.50 | 1.30 | 99 | 100 | 4.5 |
| Example 65 | La—Mg—Ni type | 4.0 | 1.50 | 1.50 | 99 | 100 | 5.8 |
| Example 66 | La—Mg—Ni type | 4.5 | 1.60 | 0.90 | 94 | 93 | 2.0 |
| Example 67 | La—Mg—Ni type | 4.5 | 1.60 | 0.95 | 99 | 98 | 2.4 |
| Example 68 | La—Mg—Ni type | 4.5 | 1.60 | 1.10 | 99 | 99 | 2.9 |
| Example 69 | La—Mg—Ni type | 4.5 | 1.60 | 1.20 | 100 | 100 | 3.6 |
| Example 70 | La—Mg—Ni type | 4.5 | 1.60 | 1.50 | 98 | 100 | 4.9 |
| Example 71 | La—Mg—Ni type | 4.5 | 1.60 | 1.60 | 99 | 100 | 6.0 |
| Example 72 | La—Mg—Ni type | 5.0 | 1.70 | 0.90 | 93 | 91 | 2.8 |
| Example 73 | La—Mg—Ni type | 5.0 | 1.70 | 1.20 | 92 | 93 | 4.6 |
| Example 74 | La—Mg—Ni type | 5.0 | 1.70 | 1.30 | 93 | 94 | 5.2 |
| Example 75 | La—Mg—Ni type | 5.0 | 1.70 | 1.70 | 92 | 95 | 6.4 |

TABLE 10

| | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
|---|---|---|---|---|---|---|---|
| Comparative Example 29 | La—Mg—Ni type | 2.5 | — | 0.90 | 68 | 52 | 0.8 |
| Comparative Example 30 | La—Mg—Ni type | 2.5 | — | 1.10 | 73 | 58 | 4.6 |
| Comparative Example 31 | La—Mg—Ni type | 2.5 | — | 1.20 | 73 | 63 | 6.5 |
| Comparative Example 32 | La—Mg—Ni type | 3.2 | 1.34 | 0.85 | 79 | 70 | 0.9 |
| Comparative Example 33 | La—Mg—Ni type | 3.2 | 1.34 | 1.50 | 98 | 95 | 12.5 |
| Comparative Example 34 | La—Mg—Ni type | 4.0 | 1.50 | 0.85 | 78 | 69 | 1.0 |
| Comparative Example 35 | La—Mg—Ni type | 4.0 | 1.50 | 1.65 | 97 | 98 | 12.4 |
| Comparative Example 36 | La—Mg—Ni type | 5.0 | 1.70 | 0.85 | 78 | 71 | 1.0 |
| Comparative Example 37 | La—Mg—Ni type | 5.0 | 1.70 | 1.80 | 99 | 97 | 13.3 |
| Comparative Example 38 | La—Mg—Ni type | 5.5 | — | 0.90 | 78 | 68 | 1.4 |
| Comparative Example 39 | La—Mg—Ni type | 5.5 | — | 1.30 | 79 | 74 | 6.1 |
| Comparative Example 40 | La—Mg—Ni type | 5.5 | — | 1.80 | 81 | 76 | 16.2 |
| Comparative Example 41 | MmNi$_5$ type | 4.0 | 1.50 | 1.20 | 78 | 73 | 4.4 |
| Comparative Example 42 | MmNi$_5$ type | 5.5 | — | 1.30 | 80 | 74 | 10.5 |

EXAMPLE 76

<Preparation of a paste-type negative electrode>

Each element was weighed so as to obtain a composition of $La_{0.63}Mg_{0.37}(Ni_{0.85}Co_{0.1}Al_{0.05})_{3.2}$, and the resultant mixture was melted in an argon atmosphere by making use of a high frequency furnace thereby to obtain an alloy ingot having the aforementioned composition.

Then, this hydrogen-absorbing alloy was then subjected to an X-ray diffraction analysis using CuK α-ray. As a result, the hydrogen-absorbing alloy thus obtained indicated a highest peak in the range of 42.1°±1°, a peak having an intensity of 9.2% of the aforementioned highest peak in the range of 30.2°±1°, and a peak having an intensity of 27% of the aforementioned highest peak in the range of 32.5°±1°. It should be noted that the intensity of each peak is one obtained by subtracting the intensity of the background from the intensity of the peak actually measured.

Then, this alloy ingot was pulverized to obtain hydrogen-absorbing alloy powder. After 100 parts by weight of the hydrogen-absorbing alloy powder thus obtained was mixed with 0.5 part by weight of carbon black, 100 parts by weight of the resultant mixture was mixed with 25 parts by weight of a 4% aqueous solution of polyvinyl alcohol thereby to obtain a paste. The paste was coated on the surface of a punched metal and then dried to obtain a negative electrode.

<Preparation of positive electrode>

First of all, 90 parts by weight of nickel hydroxide powder and 10 parts by weight of cobalt oxide powder were mixed together to obtain a mixture, which was then mixed with 0.15 part by weight of carboxymethyl cellulose, 0.15 part by weight of sodium polyacrylate and 0.5 part by weight (reduced to solid matter) of a dispersion of polytetrafluoroethylene (1.5 in specific gravity and 60 wt % in solid matter) to obtain a mixed solution. Subsequently, 45% by weight of pure water was further added to the above mixed solution and the resultant mixture was kneaded to prepare a paste.

Then, this paste was filled in a nickel-plated fibrous substrate and, after being dried, the substrate was rolled by making use of a roller press to manufacture a paste-type nickel positive electrode.

The negative electrode and the positive electrode thus prepared was spirally wound with a separator consisting of a polymer unwoven fabric being interposed therebetween thereby to obtain an electrode group.

<Preparation of a case>

A steel plate having a composition shown in the following Table 11 and exhibiting a tensile strength of 35 kgf/mm$^2$, a yield point of 20 kgf/mm$^2$ and an elastic modulus of 22,900 kgf/mm$^2$ was cold-worked thereby to form a closed-end cylindrical, which was then plated with nickel. As a result, a case (battery case) having a tensile strength, a yield point and an elastic modulus shown in the following Table 11 was obtained. By the way, the tensile strength, yield point and elastic modulus of the case were measured by the methods explained above.

Then, the aforementioned electrode group was placed in this case, and then a 8N KOH electrolyte was poured into the case. Thereafter, the case was sealed to obtain a cylindrical nickel-hydrogen secondary battery having a 4/3A size and a capacity of 4,500 mAh. By repeating the same procedures as described above, 100 pieces of the same kind of cylindrical nickel-hydrogen secondary batteries were prepared.

EXAMPLE 77

<Preparation of a case>

A steel plate having a composition shown in the following Table 11 and exhibiting a tensile strength of 33 kgf/mm$^2$, a yield point of 19 kgf/mm$^2$ and an elastic modulus of 22,100 kgf/mm$^2$ was cold-worked thereby to form a closed-end cylindrical, which was then plated with nickel. As a result, a case (battery case) having a tensile strength, a yield point and an elastic modulus shown in the following Table 11 was obtained.

The same procedures as explained in Example 76 were repeated except that the case prepared in this example was employed, thereby manufacturing 100 pieces of the same kind of cylindrical nickel-hydrogen secondary batteries.

COMPARATIVE EXAMPLE 43
<Preparation of a case>

A steel plate having a composition shown in the following Table 11 and exhibiting a tensile strength of 46 kgf/mm$^2$, a yield point of 36 kgf/mm$^2$ and an elastic modulus of 27,000 kgf/mm$^2$ was cold-worked, while applying a heat treatment, thereby to form a closed-end cylindrical, which was then plated with nickel. As a result, a case (battery case) having a tensile strength, a yield point and an elastic modulus shown in the following Table 11 was obtained.

The same procedures as explained in Example 76 were repeated except that the case prepared in this example was employed, thereby manufacturing 100 pieces of the same kind of cylindrical nickel-hydrogen secondary batteries.

The secondary batteries of Examples 76 and 77 and Comparative Example 43 (100 pieces in each example) were subjected to a charge/discharge cycle under the conditions shown below thereby to investigate percent defective in capacity that has been generated up to the ends of 10th cycle, 50th cycle, 100th cycle and 200th cycle. The results are shown in Table 12.

Charge/discharge condition

Charge current: 4,500 mA

Charging time: 1.3 hours

Discharge current: 4,500 mA

Discharge-terminating voltage: 1V does not meet the aforementioned conditions with respect to the tensile strength, yield point and elastic modulus was subject to percent defective in capacity at the initial stage of the charge/discharge cycle.

EXAMPLE 78
<Preparation of a case>

A steel plate having a composition shown in the following Table 13 and exhibiting a tensile strength of 33 kgf/mm$^2$, a yield point of 19 kgf/mm$^2$ and an elastic modulus of 21,500 kgf/mm$^2$ was cold-worked thereby to form a closed-end cylindrical, which was then plated with nickel. As a result, a case (battery case) having a tensile strength, a yield point and an elastic modulus shown in the following Table 13 was obtained.

The same procedures as explained in Example 76 were repeated except that the case prepared in this example was employed, thereby manufacturing 100 pieces of the same kind of cylindrical nickel-hydrogen secondary batteries.

EXAMPLE 79
<Preparation of a case>

A steel plate having a composition shown in the following Table 13 and exhibiting a tensile strength of 34 kgf/mm$^2$, a yield point of 23 kgf/mm$^2$ and an elastic modulus of 22,600 kgf/mm$^2$ was cold-worked thereby to form a closed-end cylindrical, which was then plated with nickel. As a result, a case (battery case) having a tensile strength, a yield point and an elastic modulus shown in the following Table 13 was obtained.

The same procedures as explained in Example 76 were repeated except that the case prepared in this example was

TABLE 11

| | Components of case (%) | | | | Tensile strength | Yield point | Elastic modulus |
|---|---|---|---|---|---|---|---|
| | C | Mn | P | S | (kgf/mm$^2$) | (kgf/mm$^2$) | (kgf/mm$^2$) |
| Example 76 | 0.09 | 0.43 | 0.020 | 0.031 | 71 | 43 | 24100 |
| Example 77 | 0.07 | 0.37 | 0.028 | 0.025 | 69 | 40 | 23800 |
| Comparative Example 43 | 0.19 | 0.60 | 0.031 | 0.036 | 83 | 59 | 31000 |

TABLE 12

| | Percent lowering capacity (%) | | | |
|---|---|---|---|---|
| | After 10 cycles | After 50 cycles | After 100 cycles | After 200 cycles |
| Example 76 | 0 | 0 | 0 | 0 |
| Example 77 | 0 | 0 | 0 | 0 |
| Comparative Example 43 | 9 | 18 | 24 | 35 |

As seen from Tables 11 and 12, the secondary batteries of Examples 76 and 77 each comprising a negative electrode containing the hydrogen-absorbing alloy represented by the aforementioned general formula (A) and a case having a tensile strength falling within the range of 65 to 80 kgf/mm$^2$, a yield point falling within the range of 30 to 55 kgf/mm$^2$ and an elastic modulus falling within the range of 20,000 to 30,000 kgf/mm$^2$ were free from any percent defective in capacity during the charge/discharge cycle. Whereas the secondary battery of Comparative Example 43 comprising the aforementioned negative electrode and a case which employed, thereby manufacturing 100 pieces of the same kind of cylindrical nickel-hydrogen secondary batteries.

COMPARATIVE EXAMPLE 44
<Preparation of a case>

A steel plate having a composition shown in the following Table 13 and exhibiting a tensile strength of 49 kgf/mm$^2$, a yield point of 38 kgf/mm$^2$ and an elastic modulus of 26,500 kgf/mm$^2$ was cold-worked thereby to form a closed-end cylindrical, which was then plated with nickel. As a result, a case (battery case) having a tensile strength, a yield point and an elastic modulus shown in the following Table 13 was obtained.

The same procedures as explained in Example 76 were repeated except that the case prepared in this example was employed, thereby manufacturing 100 pieces of the same kind of cylindrical nickel-hydrogen secondary batteries.

The secondary batteries of Examples 78 and 79 and Comparative Example 44 (100 pieces in each example) were subjected to a charge/discharge cycle under the same conditions as mentioned above thereby to investigate percent defective in capacity that has been generated up to the ends of 10th cycle, 50th cycle, 100th cycle and 200th cycle. The results are shown in Table 14.

TABLE 13

| | Components of case (%) | | | | Tensile strength | Yield point | Elastic modulus |
|---|---|---|---|---|---|---|---|
| | C | Mn | P | S | (kgf/mm$^2$) | (kgf/mm$^2$) | (kgf/mm$^2$) |
| Example 78 | 0.06 | 0.40 | 0.037 | 0.030 | 68 | 42 | 22000 |
| Example 79 | 0.07 | 0.35 | 0.040 | 0.023 | 70 | 45 | 22800 |
| Comparative Example 44 | 0.20 | 0.57 | 0.036 | 0.034 | 85 | 60 | 30500 |

TABLE 14

| | Percent lowering capacity (%) | | | |
|---|---|---|---|---|
| | After 10 cycles | After 50 cycles | After 100 cycles | After 200 cycles |
| Example 78 | 0 | 0 | 0 | 0 |
| Example 79 | 0 | 0 | 0 | 0 |
| Comparative Example 44 | 8 | 21 | 26 | 34 |

As seen from Tables 13 and 14, the secondary batteries of Examples 78 and 79 each comprising a negative electrode containing the hydrogen-absorbing alloy represented by the aforementioned general formula (A) and a case having a tensile strength falling within the range of 65 to 80 kgf/mm$^2$, a yield point falling within the range of 30 to 55 kgf/mm$^2$ and an elastic modulus falling within the range of 20,000 to 30,000 kgf/mm$^2$ were free from any percent defective in capacity during the charge/discharge cycle. Whereas the secondary battery of Comparative Example 44 comprising the aforementioned negative electrode and a case which does not meet the aforementioned conditions with respect to the tensile strength, yield point and elastic modulus was subject to percent defective in capacity at the initial stage of the charge/discharge cycle.

EXAMPLES 80–95 AND COMPARATIVE EXAMPLES 45–60

<Preparation of a negative electrode>

100 parts by weight of the hydrogen-absorbing alloy powder of the same kind as employed in Example 1 was mixed with 25 parts by weight of a 4% aqueous solution of polyvinyl alcohol thereby to obtain a paste. The paste was then stuffed into a nickel foamed substrate employed as a conductive substrate, and the resultant substrate was then press-molded to obtain a paste type negative electrode where a mixture containing the hydrogen-absorbing alloy was carried on the conductive substrate.

<Preparation of positive electrode>

First of all, 90 parts by weight of nickel hydroxide powder and 10 parts by weight of cobalt oxide powder were mixed together to obtain a mixture, which was then mixed with 0.15 part by weight of carboxymethyl cellulose, 0.15 part by weight of sodium polyacrylate and 0.5 part by weight (reduced to solid matter) of a dispersion of polytetrafluoroethylene (1.5 in specific gravity and 60 wt % in solid matter) to obtain a mixed solution. Subsequently, 45% by weight of water was further added to the above mixed solution and the resultant mixture was kneaded to prepare a paste. Then, this paste was filled in a nickel-plated fibrous substrate and, after being dried, the substrate was rolled by making use of a roller press to manufacture a paste-type nickel positive electrode.

<Preparation of separator>

A polypropylene non-woven fabric was manufactured from polypropylene resin by means of a spun-bonding method. Then, the resultant non-woven fabric was dipped into an aqueous solution of acrylic acid and then irradiated with ultraviolet rays to graft-polymerize the non-woven fabric with acrylic monomer. Thereafter, the resultant non-woven fabric was washed to remove any unreacted acrylic acid and then dried to obtain a separator.

The negative electrode and the positive electrode thus prepared was spirally wound with the aforementioned separator being interposed therebetween thereby to obtain an electrode group. The density of the mixture in the negative electrode, the tightness of the electrode group to be calculated from the aforementioned formula (II) and the ratio of longest diameter of electrode group in relative to the inner diameter of the case are shown in the following Tables 15 to 16. In this case, the density of the mixture in the negative electrode was varied by altering the filling quantity of the paste. Further, the tightness was varied by altering the thickness of the negative electrode.

Then, each electrode group and an electrolyte consisting of 3.5N of KOH, 4N of NaOH and 1N of LiOH were placed in a closed-end cylindrical case thereby to assembling a 4/3A size cylindrical nickel-hydrogen secondary battery having a structure as shown in FIG. 1.

COMPARATIVE EXAMPLES 61–65

A cylindrical nickel-hydrogen secondary battery where the density of the mixture in the negative electrode and the tightness of the electrode group were those as indicated in the following Table 17 was assembled in the same manner as that of Examples 80–95 except that the same kind of hydrogen-absorbing alloy as employed in Comparative Example 13 was employed herein.

The secondary batteries obtained from Examples 80 to 95 were subjected to one charge/discharge cycle wherein these batteries were charged to a depth of 150% with a current of 0.1C, and then discharged with 1C until the voltage was lowered down to 0.8V, and then further subjected to ten charge/discharge cycles wherein these batteries were charged to a depth of 150% with a current of 0.3C, and then discharged with 1C until the voltage was lowered down to 1.0V in each cycle, thus rendering the discharge capacity of each battery to become constant. After this constant discharge capacity was confirmed, the self-discharge property of the batteries was measured.

First of all, these secondary batteries were charged to a depth of 150% with a current of 0.3C at the normal temperature, and then stored for seven days in a thermostat which was kept at a temperature of 50°C. Thereafter, the temperature of these secondary batteries was returned to the normal temperature. Then, these secondary batteries were discharged with an electric quantity of 1C until the battery voltage was decreased down to 1.0V, and the discharge capacity at this moment (residual capacity) was measured. Then, the ratio of residual capacity "R" was calculated from the following formula, and the self-discharge property of the secondary battery was determined based on this ratio of residual capacity "R". The results are shown in Tables 15 to 17.

$$R(\%)=(C_2/C_1)\times 100$$

wherein $C_1$ denotes a discharge capacity which was measured after a charge/discharge cycle wherein a secondary battery was charged to a depth of 150% with a current of 0.3C, and then discharged with an electric quantity of 1C until the battery voltage was decreased down to 1.0V before it was stored in a thermostat kept at a temperature of 50° C. for seven days; and $C_2$ denotes a residual capacity, i.e. a discharge capacity which was measured after a secondary battery was stored in a thermostat kept at a temperature of 50° C. for seven days.

TABLE 15

|  | Hydrogen-absorbing alloy | Density of mixture (g/cc) | Tightness (%) | Ratio of longest diameter of electrode group to inner diameter of case (%) | Ratio of residual capacity (%) |
| --- | --- | --- | --- | --- | --- |
| Example 80 | $La_{0.7}Mg_{0.3}Ni_{2.5}Co_{0.5}$ | 5.1 | 98 | 99 | 75 |
| Example 81 | $La_{0.7}Mg_{0.3}Ni_{2.5}Co_{0.5}$ | 5.3 | 98 | 99 | 77 |
| Example 82 | $La_{0.7}Mg_{0.3}Ni_{2.5}Co_{0.5}$ | 5.5 | 98 | 99 | 78 |
| Example 83 | $La_{0.7}Mg_{0.3}Ni_{2.5}Co_{0.5}$ | 5.8 | 98 | 99 | 76 |
| Example 84 | $La_{0.7}Mg_{0.3}Ni_{2.5}Co_{0.5}$ | 5.1 | 100 | 99 | 78 |
| Example 85 | $La_{0.7}Mg_{0.3}Ni_{2.5}Co_{0.5}$ | 5.3 | 100 | 99 | 80 |
| Example 86 | $La_{0.7}Mg_{0.3}Ni_{2.5}Co_{0.5}$ | 5.5 | 100 | 99 | 81 |
| Example 87 | $La_{0.7}Mg_{0.3}Ni_{2.5}Co_{0.5}$ | 5.8 | 100 | 99 | 79 |
| Example 88 | $La_{0.7}Mg_{0.3}Ni_{2.5}Co_{0.5}$ | 5.1 | 105 | 100 | 80 |
| Example 89 | $La_{0.7}Mg_{0.3}Ni_{2.5}Co_{0.5}$ | 5.3 | 105 | 100 | 82 |
| Example 90 | $La_{0.7}Mg_{0.3}Ni_{2.5}Co_{0.5}$ | 5.5 | 105 | 100 | 83 |
| Example 91 | $La_{0.7}Mg_{0.3}Ni_{2.5}Co_{0.5}$ | 5.8 | 105 | 100 | 81 |
| Example 92 | $La_{0.7}Mg_{0.3}Ni_{2.5}Co_{0.5}$ | 5.1 | 110 | 100 | 76 |
| Example 93 | $La_{0.7}Mg_{0.3}Ni_{2.5}Co_{0.5}$ | 5.3 | 110 | 100 | 78 |
| Example 94 | $La_{0.7}Mg_{0.3}Ni_{2.5}Co_{0.5}$ | 5.5 | 110 | 100 | 80 |
| Example 95 | $La_{0.7}Mg_{0.3}Ni_{2.5}Co_{0.5}$ | 5.8 | 110 | 100 | 77 |

TABLE 16

|  | Hydrogen-absorbing alloy | Density of mixture (g/cc) | Tightness (%) | Ratio of longest diameter of electrode group to inner diameter of case (%) | Ratio of residual capacity (%) |
| --- | --- | --- | --- | --- | --- |
| Comparative Example 45 | $La_{0.7}Mg_{0.3}Ni_{2.5}Co_{0.5}$ | 5.0 | 98 | 98 | 61 |
| Comparative Example 46 | $La_{0.7}Mg_{0.3}Ni_{2.5}Co_{0.5}$ | 5.0 | 100 | 98 | 62 |
| Comparative Example 47 | $La_{0.7}Mg_{0.3}Ni_{2.5}Co_{0.5}$ | 5.0 | 105 | 100 | 64 |
| Comparative Example 48 | $La_{0.7}Mg_{0.3}Ni_{2.5}Co_{0.5}$ | 5.0 | 110 | 100 | 65 |
| Comparative Example 49 | $La_{0.7}Mg_{0.3}Ni_{2.5}Co_{0.5}$ | 6.0 | 98 | 99 | 64 |
| Comparative Example 50 | $La_{0.7}Mg_{0.3}Ni_{2.5}Co_{0.5}$ | 6.0 | 100 | 100 | 63 |
| Comparative Example 51 | $La_{0.7}Mg_{0.3}Ni_{2.5}Co_{0.5}$ | 6.0 | 105 | 100 | 60 |
| Comparative Example 52 | $La_{0.7}Mg_{0.3}Ni_{2.5}Co_{0.5}$ | 6.0 | 110 | 100 | 58 |
| Comparative Example 53 | $La_{0.7}Mg_{0.3}Ni_{2.5}Co_{0.5}$ | 5.1 | 95 | 95 | 55 |
| Comparative Example 54 | $La_{0.7}Mg_{0.3}Ni_{2.5}Co_{0.5}$ | 5.3 | 95 | 95 | 58 |
| Comparative Example 55 | $La_{0.7}Mg_{0.3}Ni_{2.5}Co_{0.5}$ | 5.5 | 95 | 96 | 60 |
| Comparative Example 56 | $La_{0.7}Mg_{0.3}Ni_{2.5}Co_{0.5}$ | 5.8 | 95 | 96 | 63 |
| Comparative Example 57 | $La_{0.7}Mg_{0.3}Ni_{2.5}Co_{0.5}$ | 5.1 | 112 | 100 | 66 |
| Comparative Example 58 | $La_{0.7}Mg_{0.3}Ni_{2.5}Co_{0.5}$ | 5.3 | 112 | 100 | 65 |
| Comparative Example 59 | $La_{0.7}Mg_{0.3}Ni_{2.5}Co_{0.5}$ | 5.5 | 112 | 100 | 64 |

TABLE 16-continued

|  | Hydrogen-absorbing alloy | Density of mixture (g/cc) | Tightness (%) | Ratio of longest diameter of electrode group to inner diameter of case (%) | Ratio of residual capacity (%) |
|---|---|---|---|---|---|
| Comparative Example 60 | $La_{0.7}Mg_{0.3}Ni_{2.5}Co_{0.5}$ | 5.8 | 112 | 100 | 62 |

TABLE 17

|  | Hydrogen-absorbing alloy | Density of mixture (g/cc) | Tightness (%) | Ratio of longest diameter of electrode group to inner diameter of case (%) | Ratio of residual capacity (%) |
|---|---|---|---|---|---|
| Comparative Example 61 | $Mm_{1.0}Ni_{4.0}Co_{0.4}Mn_{0.3}Al_{0.3}$ | 5.1 | 100 | 98 | 65 |
| Comparative Example 62 | $Mm_{1.0}Ni_{4.0}Co_{0.4}Mn_{0.3}Al_{0.3}$ | 5.3 | 100 | 98 | 65 |
| Comparative Example 63 | $Mm_{1.0}Ni_{4.0}Co_{0.4}Mn_{0.3}Al_{0.3}$ | 5.5 | 100 | 99 | 65 |
| Comparative Example 64 | $Mm_{1.0}Ni_{4.0}Co_{0.4}Mn_{0.3}Al_{0.3}$ | 5.8 | 100 | 100 | 66 |
| Comparative Example 65 | $Mm_{1.0}Ni_{4.0}Co_{0.4}Mn_{0.3}Al_{0.3}$ | 6.0 | 112 | 100 | 65 |

It is clear from Tables 15 to 17 that the secondary batteries of Examples 80 to 95, which comprising a hydrogen-absorbing alloy represented by the aforementioned general formula (A) and where the density of the mixture in the negative electrode was set to fall within the range of 5.1 to 5.8 g/cc and the tightness of the electrode group was set to fall within the range of 98 to 110%, were capable of improving the ratio of residual capacity in the situation where the batteries were stored at high temperatures.

By contrast, although the aforementioned hydrogen-absorbing alloy was being employed, the secondary batteries of Comparative Examples 45 to 60 where the density of the mixture in the negative electrode or the tightness of the electrode group fell outside aforementioned ranges were found poor in the ratio of residual capacity in the situation where the batteries were stored at high temperatures. Further, the secondary batteries of Comparative Examples 61 to 64 which comprised a negative electrode containing a $MmNi_5$ type hydrogen-absorbing alloy, and where the density of the mixture in the negative electrode and the tightness of the electrode group fell within the aforementioned ranges were found almost equivalent in the ratio of residual capacity to the secondary battery of Comparative Example 65 which comprised a negative electrode containing a $MmNi_5$ type hydrogen-absorbing alloy, and where the density of the mixture in the negative electrode and the tightness of the electrode group fell outside the aforementioned ranges.

Each of the secondary batteries obtained from Examples 85, 89, 93 and Comparative Example 62 was subjected to a repetition of charge/discharge cycle wherein each battery was charged to a depth of 150% with a current of 0.3C, and then discharged with 1C until the voltage was lowered down to 1.0V in each cycle. In this case, the number of cycle when the discharge capacity was lowered to 80% of the discharge capacity at moment of the first cycle was measured, the results being shown in Table 18.

TABLE 18

|  | Cycle life |
|---|---|
| Example 85 | 650 |
| Example 89 | 740 |
| Example 93 | 800 |
| Example 62 | 480 |

As seen from Table 18, the secondary batteries of Examples 85, 89 and 93 were found superior in charge/discharge cycle life as compared with the secondary battery of Comparative Example 62.

As explained above, it is possible according to this invention to provide a nickel-hydrogen secondary battery of large capacity, which is capable of exhibiting practical low temperature discharging property as well as practical internal pressure.

Additionally, it is possible according to this invention to provide a nickel-hydrogen secondary which comprises a negative electrode containing a hydrogen-absorbing alloy containing a larger quantity of A-site than $AB_5$ type composition, being capable of overcoming the problem of poor hydrogen desorption and enabling to realize all of high capacity, low manufacturing cost and light weight, and which is capable of prominently minimizing the ratio of defective during the charge/discharge cycle and improving the cycle life.

Further, it is also possible according to this invention to provide a nickel-hydrogen secondary battery, which is capable of enhancing the capacity per volume and inhibiting self-discharge and internal pressure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nickel-hydrogen secondary battery which comprises a negative electrode comprising a hydrogen-absorbing alloy represented by the following general formula (A), a positive electrode, and an alkaline electrolyte, and which meets the following conditions represented by the following formulas (1) and (2);

$$(R_{1-x}Mg_x)Ni_yA_z \quad (A)$$

wherein R contains at least one element selected from rare earth elements; A is at least one element selected from Co, Mn, Fe, V, Cr, Nb, Al, Ga, Zn, Sn, Cu, Si, P and B; and x,y and z are atomic ratio individually defined as $0<x<1.0\leq1.5$, $2.5\leq y+z<4.5$;

$$3.2\leq P\leq 5.0 \quad (1)$$

$$0.9\leq Q\leq 0.2P+0.7 \quad (2)$$

wherein P is a quantity (g) of said hydrogen-absorbing alloy per theoretical capacity 1 Ah of said positive electrode, Q os a quantity (mL) of said alkaline electrolyte per theoretical capacity 1 Ah of said positive electrode.

2. The secondary battery according to claim 1, which meets the following condition represented by the following formula (3);

$$3.6\leq P\leq 4.5 \quad (3)$$

wherein P is a quantity (g) of said hydrogen-absorbing alloy per theoretical capacity 1Ah of said positive electrode.

3. The secondary battery according to claim 1, which meets the following condition represented by the following formula (4);

$$0.95\leq Q\leq 0.2P+0.6 \quad (4)$$

wherein P is a quantity (g) of said hydrogen-absorbing alloy per theoretical capacity 1 Ah of said positive electrode, and Q is a quantity (mL) of said alkaline electrolyte per theoretical capacity 1 Ah of said positive electrode.

4. The secondary battery according to claim 1, wherein the range of said y+z is $3\leq y+z<4.5$.

5. The secondary battery according to claim 4, wherein when said hydrogen-absorbing alloy is analyzed by an X-ray diffraction method using CuKα-ray, the alloy exhibits a highest peak in the range of $42.1°\pm1°$, and does not exhibit a peak having an intensity greater than 15% of that of said highest peak in the range of $30.2°\pm1°$.

6. The secondary battery according to claim 5, wherein said hydrogen-absorbing alloy further exhibits a peak having an intensity greater than 5% of that of said highest peak in the range of $32.5°\pm1°$.

7. The secondary battery according to claim 1, wherein the range of said x is $0.15\leq x\leq 0.45$.

8. The secondary battery according to claim 1, wherein a principal phase of said hydrogen-absorbing alloy is a phase having a $CeNi_3$ type crystal structure, $PuNi_3$ type crystal structure, $Ce_2Ni7$ type crystal structure or $Gd_2Co_7$ type crystal structure.

9. The secondary battery according to claim 1, wherein R further contains at least one element selected from the group consisting of Ca, Zr and Ti.

10. The secondary battery according to claim 1, wherein R is at least one element selected from the group consisting of La, Ce, Pr, Nd and Y.

* * * * *